(12) United States Patent
Hulse

(10) Patent No.: US 6,217,201 B1
(45) Date of Patent: Apr. 17, 2001

(54) OPTICAL WAVEGUIDE ASSEMBLY FOR VEHICLE DOOR PANEL

(75) Inventor: George R. Hulse, Cookeville, TN (US)

(73) Assignee: Cooper Automotive Products, Inc., Houston, TX (US)

(*) Notice: Subject to any disclaimer, the term of this patent is extended or adjusted under 35 U.S.C. 154(b) by 0 days.

(21) Appl. No.: 09/150,672

(22) Filed: Sep. 10, 1998

Related U.S. Application Data

(63) Continuation of application No. 09/009,836, filed on Jan. 20, 1998.
(60) Provisional application No. 60/069,118, filed on Dec. 9, 1997.

(51) Int. Cl.$^7$ .................................................... F21V 9/00
(52) U.S. Cl. ......................... 362/511; 362/31; 362/581; 362/551; 362/554; 362/556; 362/558; 362/489
(58) Field of Search ................................. 362/551, 501, 362/496, 511, 554, 556, 558–560, 581, 487, 488, 582, 31

(56) References Cited

U.S. PATENT DOCUMENTS

| | | | |
|---|---|---|---|
| 2,561,756 | * 7/1951 | Shook | 362/495 |
| 3,832,028 | 8/1974 | Kapron . | |
| 3,878,503 | * 4/1975 | Martin | 362/567 |
| 3,901,581 | 8/1975 | Thiel . | |
| 4,389,698 | * 6/1983 | Cibie | 362/511 |
| 4,430,692 | * 2/1984 | Papadakis | 362/500 |
| 4,745,525 | * 5/1988 | Sheehy | 362/559 |
| 4,811,172 | * 3/1989 | Davenport et al. | 362/511 |
| 4,824,194 | 4/1989 | Karasawa . | |
| 4,958,263 | * 9/1990 | Davenport et al. | 362/511 |
| 5,303,125 | * 4/1994 | Miller | 362/554 |
| 5,416,669 | * 5/1995 | Kato et al. | 362/551 |
| 5,452,186 | * 9/1995 | Dassanayake | 362/511 |
| 5,647,658 | * 7/1997 | Ziadi | 362/471 |
| 5,791,756 | 8/1998 | Hulse et al. . | |
| 5,812,714 | 9/1998 | Hulse . | |
| 5,938,324 | * 8/1999 | Salmon et al. | 362/555 |

OTHER PUBLICATIONS

Hulse et al., "Analysis of Waveguide Geometries at Bends and Branches for the Directing of Light", Paper No. 98?????, pp. 1–6.

Hulse, "Focus–less Optics and Their Use in Automotive Distributed Lighting Systems", SAE Technical Paper Series 970252, SAE International, International Congress & Exposition, Detroit, Michigan, Feb. 24–27, 1997, pp. 1–5.

Hulse et al, "HID Driven Focus–less Optics System for Complete Automotive Distributed Lighting Systems", Paper No. 98?????, pp. 1–3.

Hulse et al., "Three Specific Design Issues Associated With Automotive Distributed Lighting Systems: Size, Efficiency, and Reliability", SAE Technical Paper Series 960492, SAE International, International Congress & Exposition, Detroit, Michigan, Feb.

* cited by examiner

Primary Examiner—Thomas M. Sember
Assistant Examiner—Ismeal Negron
(74) Attorney, Agent, or Firm—Reising, Ethington, Barnes, Kisselle, Learman & McCulloch, P.C.

(57) ABSTRACT

An optical waveguide assembly for distributing light within a vehicle door panel includes a light source that outputs light to an optical waveguide. A trunk waveguide that propagates light through internal reflection has output branches and a trunk input portion connected to the light source. Branch waveguides that propagate light through internal reflection extend from the output branches of the trunk waveguide to lighting outputs of the vehicle door panel. Support arms extend between the branch waveguides and support the branch waveguides within the vehicle door panel.

29 Claims, 35 Drawing Sheets

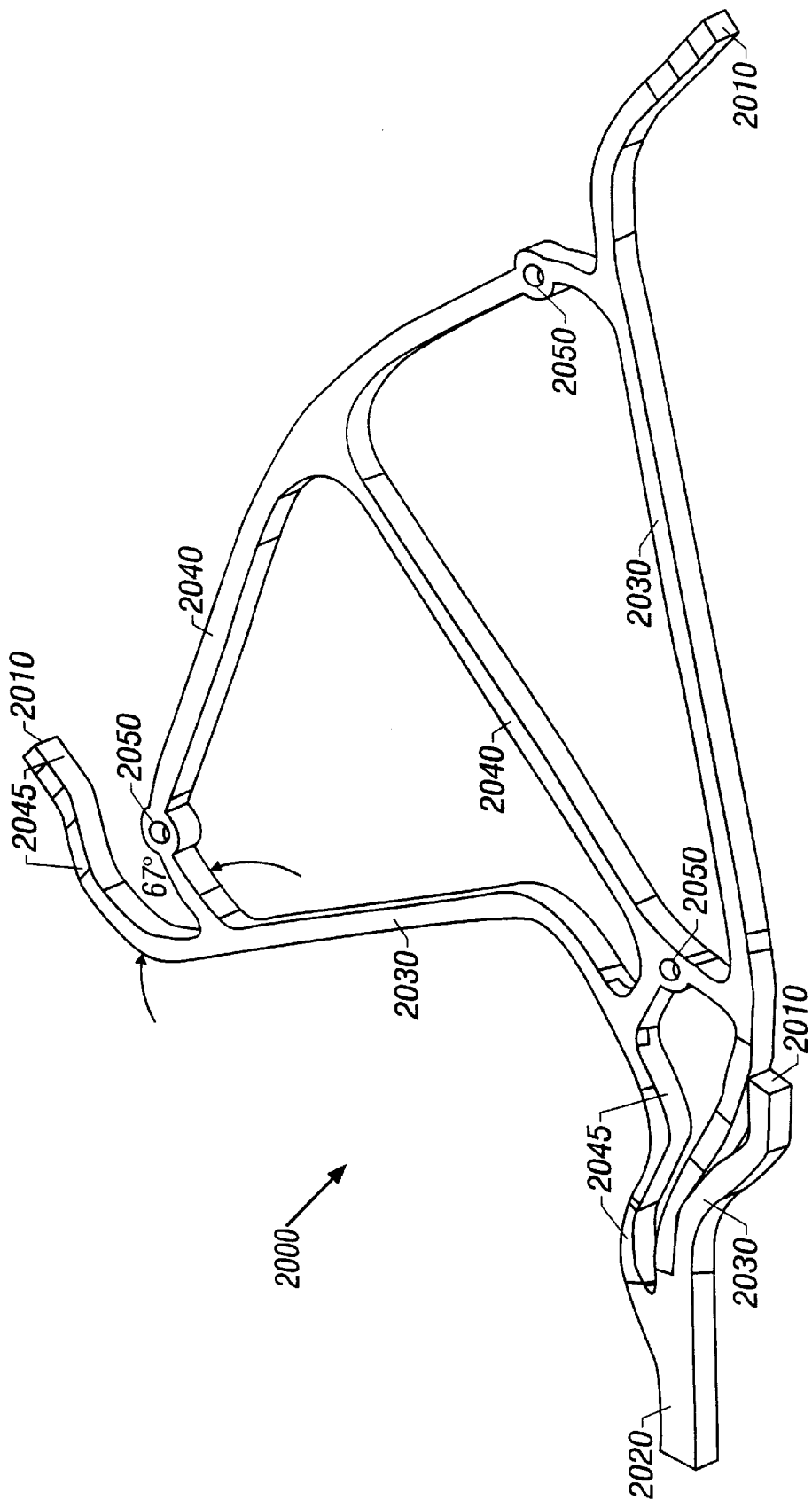

OPTICAL WAVEGUIDE ASSEMBLY FOR VEHICLE DOOR PANEL

CROSS REFERENCE TO RELATED APPLICATION

This application claims priority from Provisional Application No. 60/069,118, "HID DRIVEN FOCUS-LESS OPTICS SYSTEM," filed Dec. 9, 1997 and application Ser. No. 09/009,836, "DISTRIBUTED LIGHTING SYSTEM," filed Jan. 20, 1998, both of which are incorporated by reference.

BACKGROUND

The invention relates to distributed lighting systems.

Distributed lighting systems distribute light from one or more light sources in central or strategic locations to one or more remote locations. A distributed lighting system promises several advantages over conventional lighting techniques, including low power consumption, extended life, heat reduction where the light is emitted, and increased design flexibility.

SUMMARY

The invention provides a distributed lighting system (DLS) for use, for example, in an automobile. Issues associated with incorporating a distributed lighting system into an automobile are discussed by Hulse, Lane, and Woodward in "Three Specific Design Issues Associated with Automotive Distributed Lighting Systems: Size, Efficiency and Reliability," SAE Technical Paper Series, Paper No. 960492, which was presented at the SAE International Congress and Exposition, Detroit, Mich., Feb. 26–29, 1996, and Hulse and Mullican in "Analysis of Waveguide Geometries at Bends and Branches for the Directing of Light," SAE Technical Paper Series, Paper No. 981189, which are incorporated herein by reference.

In one aspect, generally, an optical waveguide assembly for distributing light within a vehicle door panel includes a light source that outputs light to an optical waveguide. A trunk waveguide that propagates light through internal reflection has output branches and a trunk input portion connected to the light source. Branch waveguides that propagate light through internal reflection extend from the output branches of the trunk waveguide to lighting outputs of the vehicle door panel. Support arms extend between the branch waveguides and support the branch waveguides within the vehicle door panel.

Embodiments may include one or more of the following features. The waveguides and support arms may be formed from a single piece of solid material. The solid material may be injection molded plastic.

The optical waveguide assembly may include a compact illuminator as the light source. The compact illuminator may include a housing having reflective interior surfaces, a bulb positioned within the housing, and an optical waveguide output port that holds an optical waveguide in position to receive light from the bulb.

The compact illuminator may include a housing having open ends configured to receive waveguides and a reflector positioned within the housing. The reflector may include open end portions, a central portion between the end portions, a light source positioned within the central portion, and side walls extending between the end portions and at least partially enclosing the central portion. The side walls may protrude inward toward the light source.

The optical waveguide assembly may have lighting output elements positioned at the ends of the branch waveguides. The lighting output element may be an optical waveguide output element. The waveguide output element may have an input face and a transmission portion extending from the input face. The transmission portion may widen at an end to form a conical end portion having a convex lens at an end of the conical end portion.

The lighting output element may be a waveguide bend. The waveguide bend may have a bend ratio that is less than 3:1 or less than 1:1.

In another aspect, an optical waveguide assembly for distributing light within a vehicle door panel includes a light source. A cylindrical sleeve accommodates and receives light from the light source. The sleeve has a central axis. A waveguide collar is formed from a solid, planar block of material having a central portion to accommodate and surround the sleeve. The waveguide collar has output branches extending in a plane away from the central portion. The plane is substantially perpendicular to the central axis. The optical waveguide assembly further includes branch waveguides that propagate light through internal reflection. The branch waveguides extend from the output branches of the waveguide collar to lighting outputs of the vehicle door panel. Support arms extend between the branch waveguides and support the branch waveguides within the vehicle door panel.

In another aspect, an optical waveguide assembly for distributing light within a vehicle door panel includes a hub portion connected to receive light from a light source. The hub portion has outputs. Waveguides that propagate light through internal reflection extend from the outputs of the hub to lighting outputs of the vehicle door panel. Support arms extend between the waveguides and support the waveguides within the vehicle door panel.

Other features and advantages will be apparent from the following detailed description, including the drawings, and from the claims.

BRIEF DESCRIPTION OF THE DRAWINGS

FIG. 20A is a perspective view of a vehicle door panel waveguide assembly.

DESCRIPTION

Figure 1:
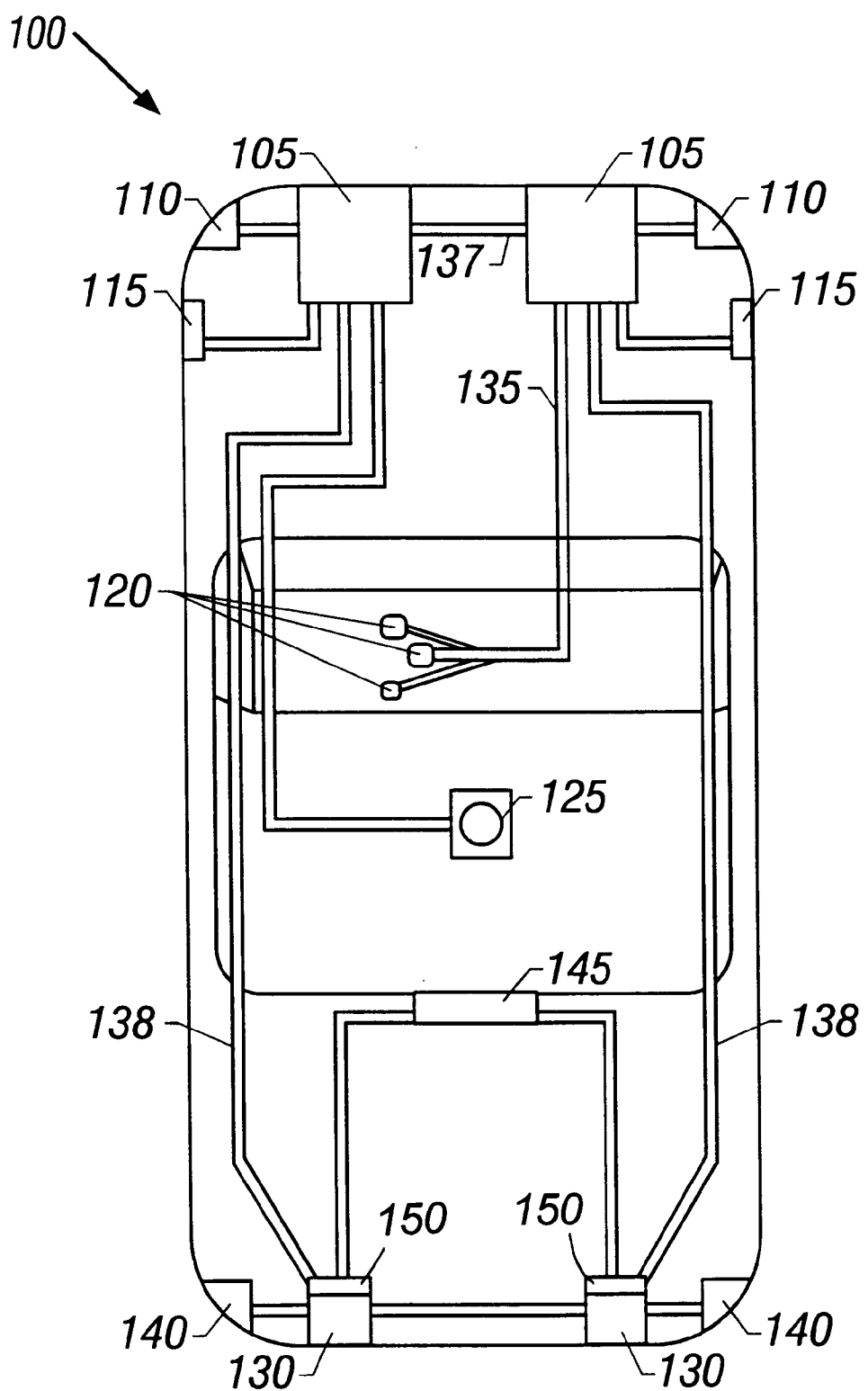
FIG. 1 is a block diagram of a vehicle distributed lighting system with hybrid lighting subsystems.

Referring to FIG. 1, a vehicle distributed lighting system (DLS) 100 includes hybrid headlamp subsystems 105, turn signal subsystems 110 and 140, and hybrid tail light subsystems 130. The hybrid headlamp subsystems 105 provide primary forward illumination for the vehicle. The headlamp subsystems 105 are also light sources for other exterior lights, such as front turn signals of the subsystems 110 and side markers 115, as well as interior lights, such as dashboard lights 120 and dome lights 125. These other lights are connected to the headlamp subsystems by optical waveguides 135 or optical fibers. Similarly, the tail light subsystems 130 provide light for rear turn signals 140 and a center high mounted stop light (CHMSL) 145. The subsystems of the DLS are interconnected so that the light source of one subsystem serves as a redundant light source for another subsystem.

The DLS incorporates different types of optical waveguide structures to distribute light throughout the vehicle. These include joints, elements with epoxy coatings, pinched end collector portions, integrated installation snaps, integrated input optics and integrated output lenses. The DLS also includes waveguide structures to provide illumination to portions of the vehicle interior, including cup holders, assist grips, and storage pockets.

Figure 2:
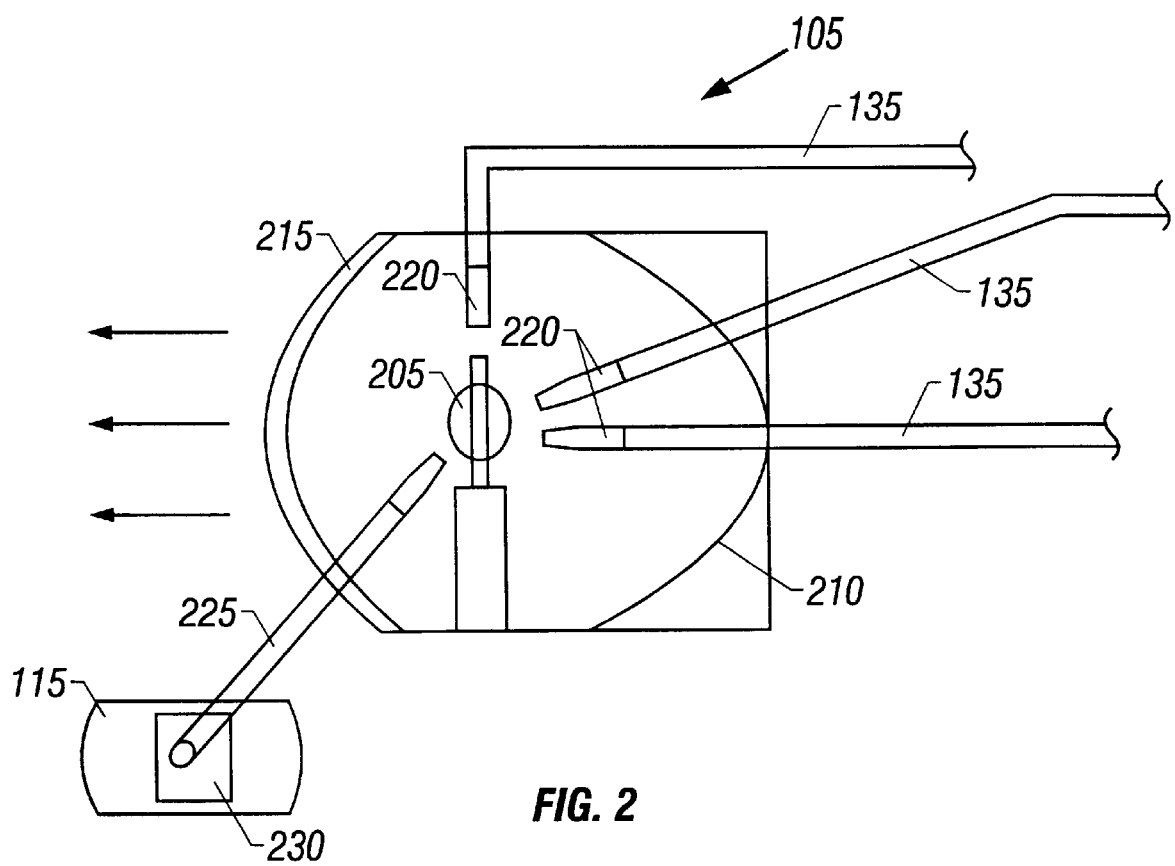
FIG. 2 shows a hybrid headlamp subsystem.

FIG. 2 illustrates a hybrid headlamp subsystem 105. The subsystem includes a light source 205 that may be implemented using, for example, a high-intensity discharge (HID) lamp. Light produced by the light source 205 is collected by a reflector 210 and directed through a lens 215 to provide the primary forward illumination for the vehicle. The reflector may be implemented as a parabolic or complex reflector.

In addition to providing the primary forward illumination, the light source 205 acts as a light source for other parts of the system. As shown in FIG. 2, waveguides 135 having collector elements 220 at their ends are positioned close to the light source 205 to receive light and transmit the light to other locations in the vehicle, such as to provide turn signals, interior lighting, fog lights, and side markers. The waveguides 135 may also carry light to other lighting subsystems to provide redundancy, such as the opposite side headlamp or the tail lights. The number of collector elements 220 may be increased as necessary to supply light for other lighting functions. The collector elements 220 may be glass rods (such as Pyrex) with ends that are polished so as to be faceted or pinched. The pinched ends increase the acceptance angle of the collector element.

FIG. 2. shows a waveguide 225 that carries light from the source to a side marker light 115. The waveguide 225 may include colored plastic filters 230 to provide a desired output color (e.g., amber) for the side marker 115. This configuration eliminates the need for an electrical connection and light bulb in the side marker 115.

Another waveguide provides light to the turn signal subsystem 110. Alternatively, the turn signal subsystem 110 may include an independent light source and may use the input from the headlamp subsystem 105 for redundancy.

Referring again to FIG. 1, waveguides or optical fibers also may carry light from the headlamp subsystem to other subsystems that have their own light sources, such as the opposite headlamp subsystem (waveguide 137) or the corresponding tail light subsystem (waveguide 138), to provide light source redundancy. When redundancy is employed and, for example, one of the headlamps fails, light from the operational headlamp will dimly illuminate the failed headlamp. This is safer for the operator of the vehicle than having only one operational headlamp. Redundancy also may be used to reduce the effects of failure of other lighting components. For example, an incandescent PC bulb may be used as a source for trunk lighting and may be connected to provide redundancy to interior reading lights.

Figure 3A:
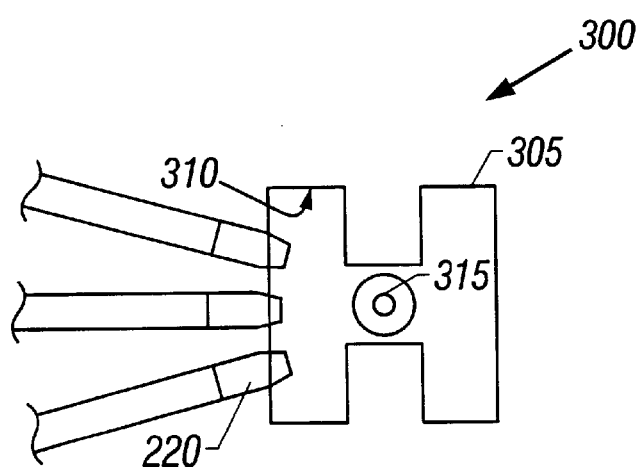
FIGS. 3A–3E shows compact illuminators.

A compact illuminator 300, such as shown in FIG. 3A, may be employed as the light source. The illuminator 300 includes a housing 305 having reflective, heat-dissipating interior surfaces 310. A light source 315 is positioned in the center of the housing 305. Waveguide collector elements 220 are positioned around the light source.

Figure 3B:
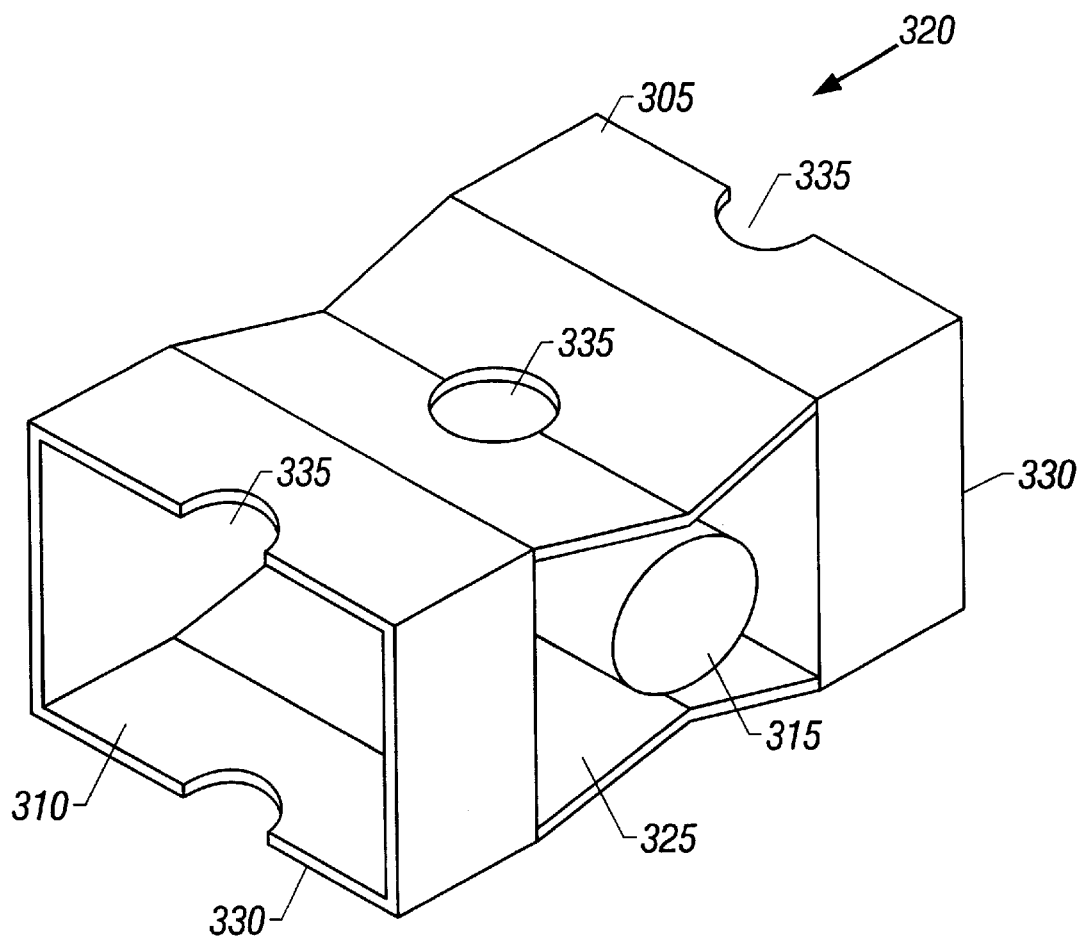

As shown in FIG. 3B, another configuration of the compact illuminator 320 includes a reflector 305 with reflective, heat-dissipating surfaces 310. The reflective surfaces 325 nearest the light source 315 are angled to more efficiently direct light to the output ports 330. However, the surfaces 325 may also be curved (e.g., parabolic or elliptical in shape) rather than planar. The reflector 305 includes vent holes 335 to reduce heat in the compact illuminator 320. The reflector 305 is easily formed from one or two pieces of stamped metal, resulting in low manufacturing costs. The reflective surfaces 325 may be formed by vapor deposition on plastic or other materials.

Figure 3C:
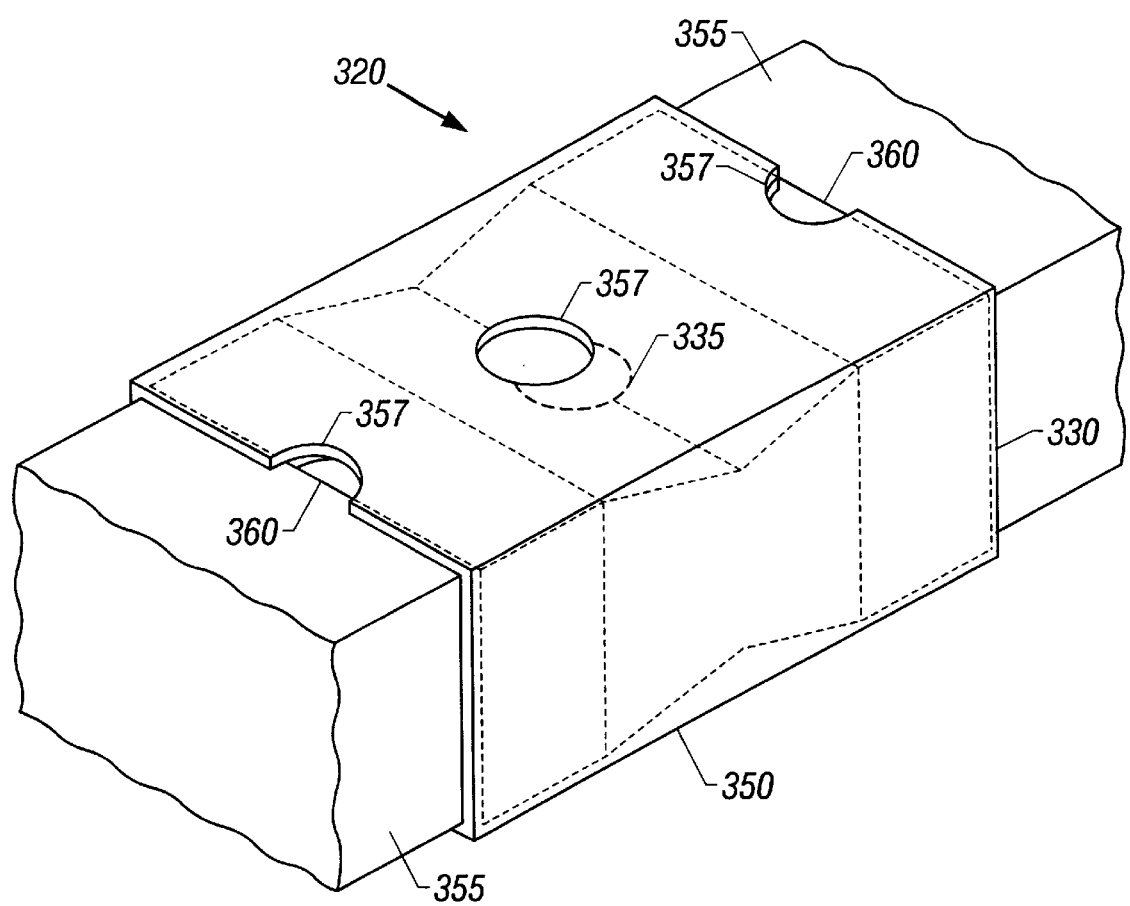

As shown in FIG. 3C, the compact illuminator 320 may have a housing 350 that surrounds the reflector 305. The housing may extend beyond the edges of the output ports 330 to provide support for optical waveguides 355 positioned at the output ports 330. The waveguides 355 may be abutted to rectangular output ports 330 and may have input faces that are the same size as the output ports 330. Alternatively, the output ports 330 and waveguides 355 may be round. In addition, fiber optic conduits may be used in place of the waveguides 355. Such a configuration provides for an efficient collection of light from the light source. The housing 350 includes vent holes 357 that are aligned with the vent holes 335 of the reflector 305.

Figure 3D:
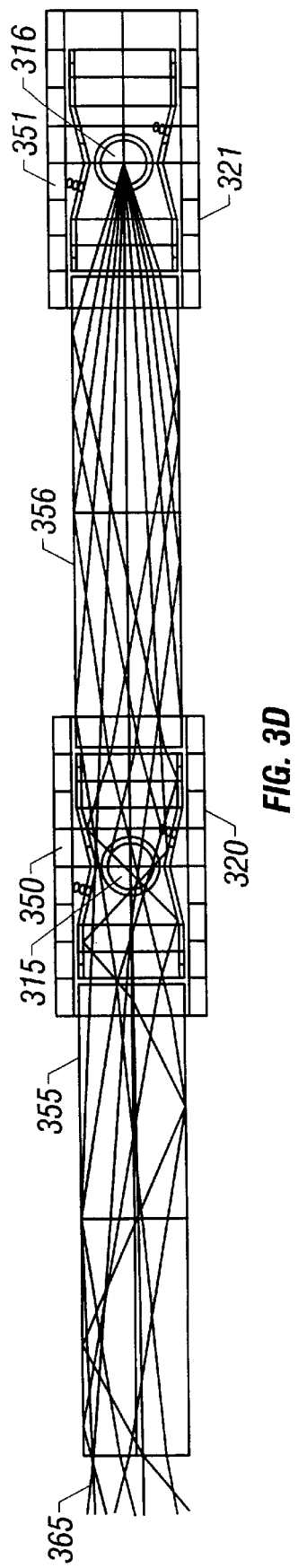

FIG. 3D shows an example of light rays 365 passing through a network of redundant compact illuminators 320 and 321. The illuminators have housings 350 and 351 and are connected by optical waveguides 355 and 356, although the illuminators also may be joined directly without an intervening waveguide. The light rays 365 initiate at a first light source 316 in the first illuminator 321. The light rays 365 pass through a waveguide 356 connected to the second illuminator 320, pass through the second illuminator 320 and are output to a second waveguide 355. The second waveguide 355 may lead to a distribution network or an output device such as an interior light for a vehicle.

Such a configuration conveniently provides light source redundancy. If both light sources 315 and 316 are functioning, then within the second illuminator 320, a portion of the light from the second light source 315 combines with the light received from the first light source 316. The combined light is output to the second waveguide 355. If one of the light sources fails, the other source will continue to provide light to the output device or distribution network, though at a reduced light level.

Figure 3E:
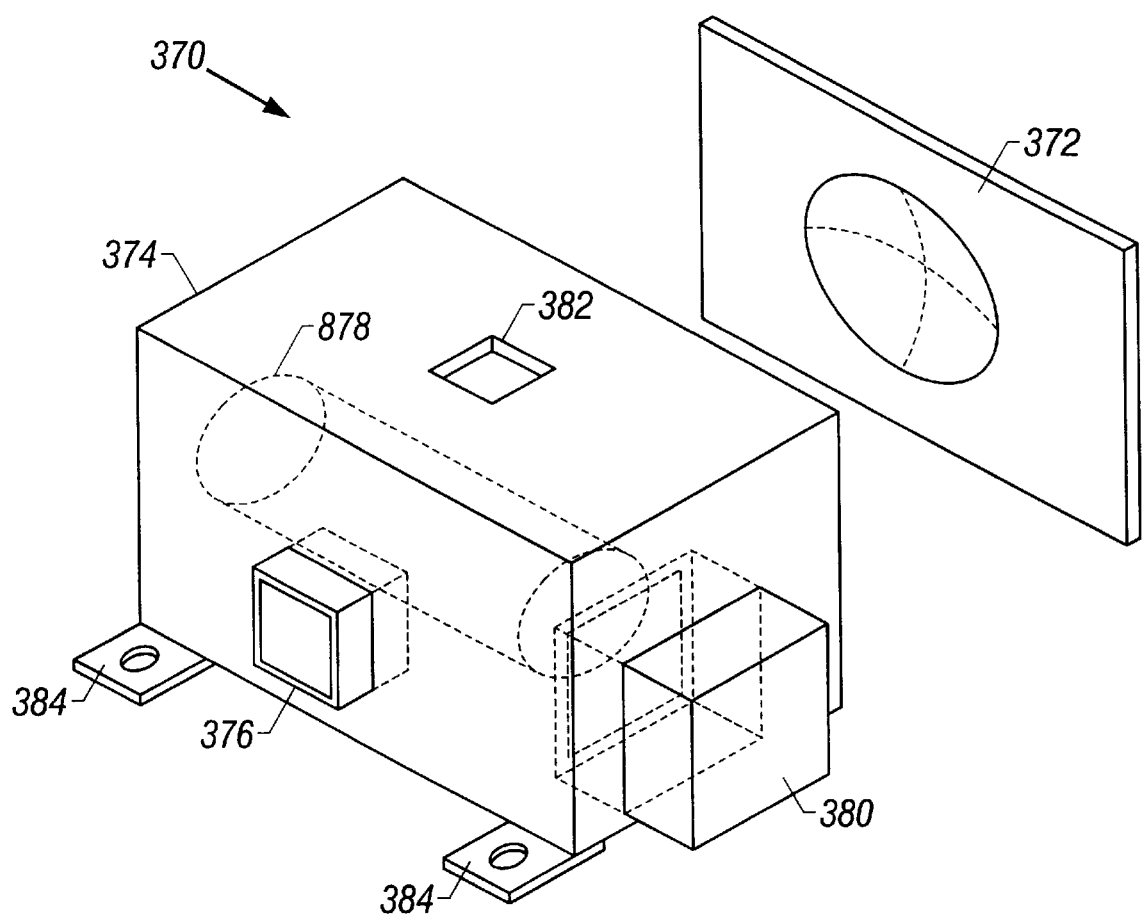

FIG. 3E shows a dual-source, hybrid compact illuminator 370 that provides a direct lighting function through a lens 372 covering one side of the housing 374 and a distributed lighting function through a waveguide output port 376. The housing 374 may be formed of metal or plastic (e.g., injected molded plastic). The hybrid compact illuminator 370 has reflective interior walls and a primary light source 378, such as a cartridge bulb. The interior walls may be curved to form a reflector to increase light collection efficiency. The waveguide output port 376 is configured so that an optical waveguide may be inserted into the port and held in position with an adhesive, such as epoxy, or by mechanical means, such as a waveguide connector. The waveguide output port 376 is positioned so that the input face of the inserted optical waveguide efficiently receives light from the primary light source. The end of the inserted waveguide may have optical collector elements or lenses formed on the input face, as described above.

The dual-source hybrid compact illuminator 370 also has a secondary light source, e.g., a cartridge bulb or a PC bulb, in a compartment 380 that protrudes from the side of the housing 374 (a single-source, hybrid compact illuminator having only a primary light source is also possible). The secondary light source may be used for lighting functions that require a lower power, longer life light source. The compartment 380 may have a waveguide output port to provide a distributed lighting function or an output lens to provide a direct lighting function.

Alternatively, the compartment 380 may be open to the interior of the housing and may extend into the housing. The compartment may be positioned so that the secondary light source provides illumination for the direct and distributed lighting functions in case of failure of the primary light source 378. Vent holes 382 and installation mounting holes 384 also are provided.

The compact illuminator has a compact size, stays cool, and reduces lamp placement error, which increases efficiency. The compact illuminator also provides a convenient building block for a redundant network to provide interior or exterior lighting functions and may easily be installed in a distributed lighting system. In addition, the hybrid compact illuminator provides both direct and distributed lighting functions.

By combining two sources in a single unit, the dual-source, hybrid compact illuminator provides light for several lighting functions and light source redundancy while lowering complexity and manufacturing costs. For example, a single circuit may be used to drive the two sources. In addition, the dual-source unit reduces the number of parts in a system, which in turn reduces cost and complexity.

Figure 4A:
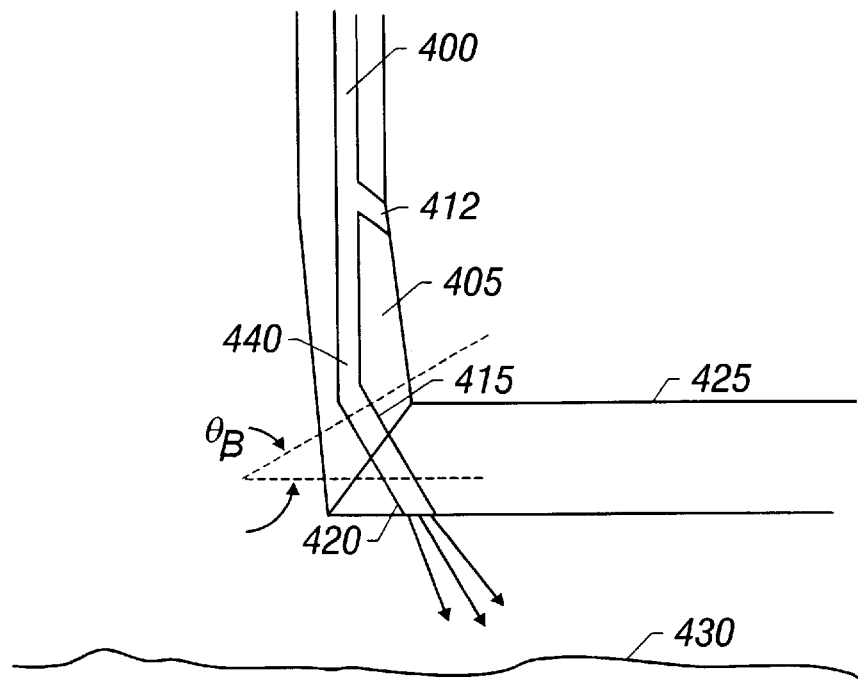
FIGS. 4A and 4B show a combination security/puddle light.
Figure 4B:
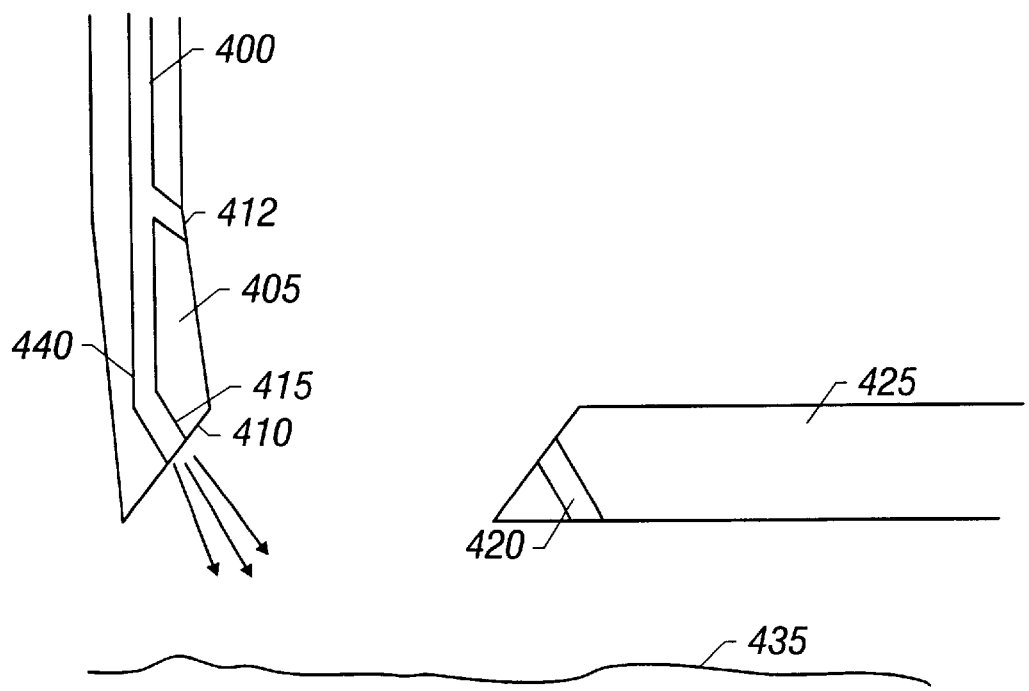

The DLS also may be used to provide other lighting functions. For example, a waveguide 400 may be installed in the door 405, as shown in FIGS. 4A and 4B, to provide a security/puddle light. The waveguide 400 runs from a light source, such as the hybrid headlamp subsystem 105 (FIG. 1), to the bottom edge 410 of the door 405. A waveguide branch 412 may be used to implement a interior door light. When the door 405 is closed, as in FIG. 4A, a door waveguide section 415 connects to a waveguide 420 that passes through the floor 425. The floor waveguide section 420 provides a security light that illuminates the area 430 underneath the vehicle. When the door 405 is open, as in FIG. 4B, the door waveguide 415 provides a puddle light that illuminates the ground 435 between the open door and the vehicle. The bend 440 in the door waveguide section 415 may have a bend angle ($\theta_B$) of, for example, 20°. The bend 440 helps to direct the output of the waveguide 400 to the desired area. Alternatively, the security/puddle light may be implemented as a hybrid subsystem that has an independent light source. The independent light source may directly provide interior lighting for the vehicle in addition to being connected to the waveguide 400 as a light source for the security/puddle light.

Another waveguide carries light from hybrid headlamp subsystem to the interior of the vehicle to provide, for example, dashboard lighting, dome lights, and reading lights. Waveguides also provide unique, aesthetically pleasing lighting effects for certain interior structures, such as cup holders, map pockets, and assist grips.

Figure 5A:
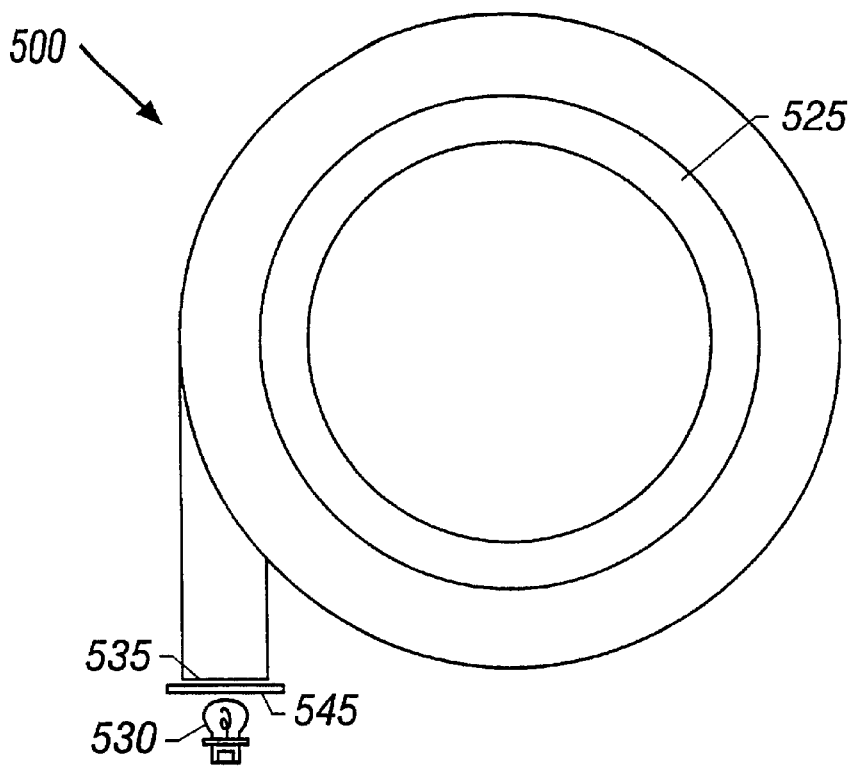
FIGS. 5A and 5B show various embodiments of a cup holder illumination component.
Figure 5B:
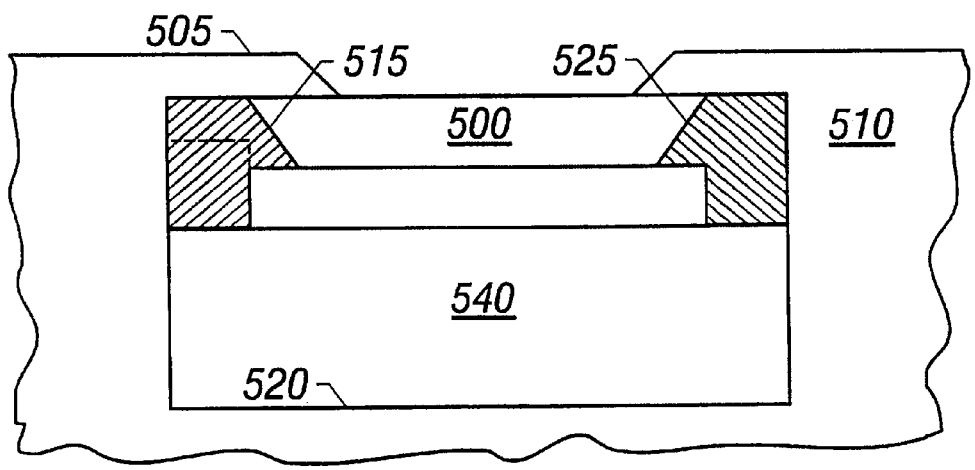

For example, as shown in FIGS. 5A and 5B, a ring-shaped waveguide element 500 may be installed under the lip 505 of a cup holder 510. Although the shape of the waveguide 500 in FIGS. 5A and 5B is circular, any shape may be used depending upon the shape and size of the cup holder 500. The efficiency of the waveguide may be improved by selecting a ratio of the inner radius (r) of the waveguide relative to the width (w) of the waveguide. For example, a waveguide with an inner radius to waveguide width ratio (r/w) of 3:1 will lose less light than a ratio of 1:1 or 0.1:1.

Figure 6A:
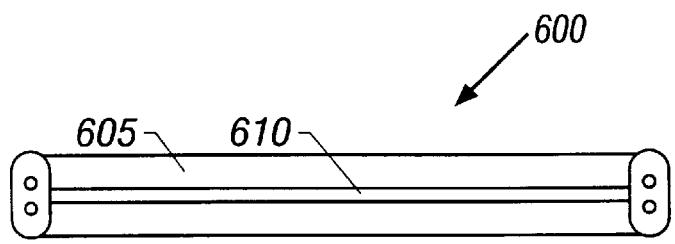
FIG. 6A is a rear view of a waveguide installed in a handgrip.
Figure 6B:
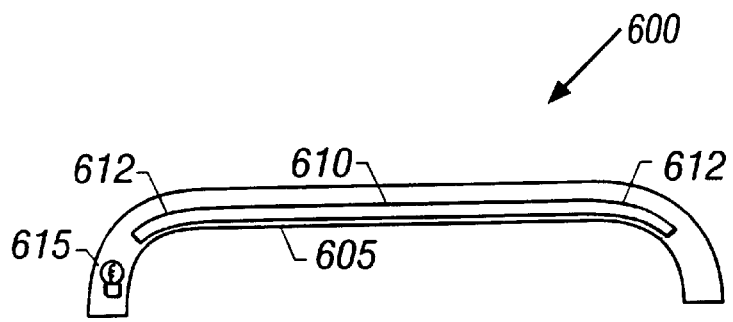
FIG. 6B is a cross-section view of a waveguide and light source installed in a handgrip.
Figure 6C:
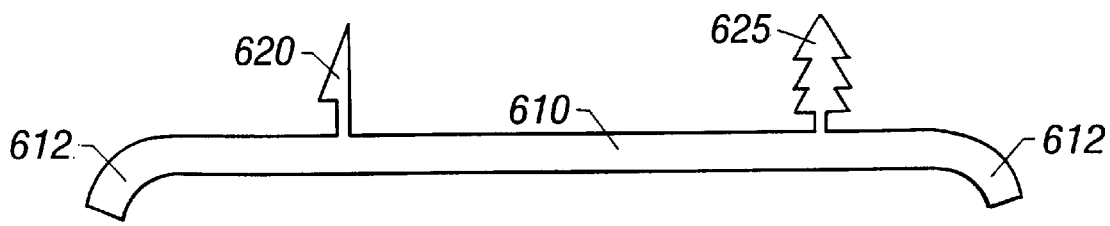
FIG. 6C shows a waveguide with integrated snaps for installation into a handgrip.

Similar structures may be used in the interior of a map pocket or, as shown in FIGS. 6A–6C, along the interior surface 605 of a assist grip 600. A length of waveguide 610 is installed along the inner surface 605. The waveguide includes bends 612 at the ends to conform to the shape of the assist grip. A small incandescent bulb 615 provides a light source. The bulb may be used in conjunction with a lens (not shown) to provide a courtesy light. Alternatively, the assist grip 600 may be connected by a waveguide to another light source in the DLS. As shown in FIG. 6C, the waveguide 610 may be formed with snaps 620 and 625 to make installation into the assist grip 600 easier.

Figure 7:
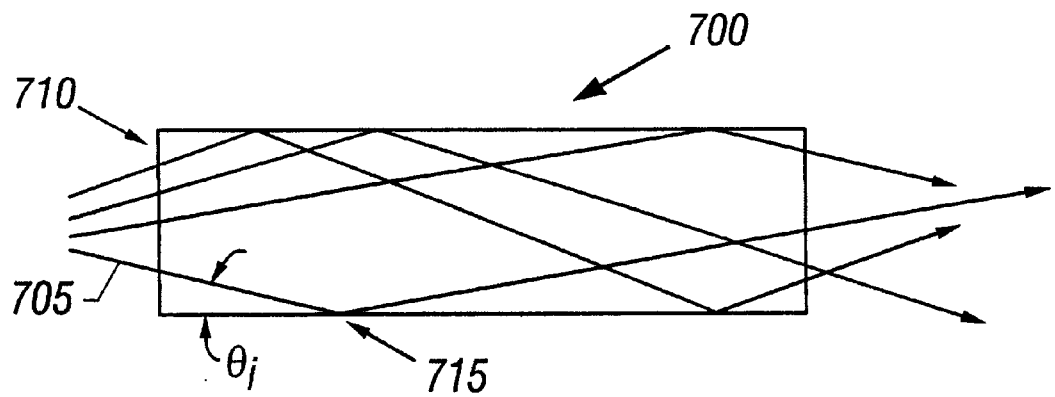
FIG. 7 is a cross-section view of an optical waveguide.

Different types of waveguide structures may be used in the DLS to transmit light from the sources to the lighting outputs. A basic waveguide, as shown in FIG. 7, may be formed from optically transparent material such as acrylic or glass. If the waveguide is formed from acrylic or a similar material, it can be manufactured using an injection molding process. The manufacture of waveguide elements using injection molding results in very low manufacturing costs compared to fiber optics. In addition, molded acrylic waveguide elements are more rigid than fiber optics, can be installed by robots, and generally do not require maintenance. Waveguide elements can also achieve much smaller bend radii than fiber.

As shown in FIG. 7, a light ray 705 entering the input face 710 proceeds through the waveguide 700 until the light ray 705 reaches an outer surface 715 of the waveguide 700, i.e. an interface between the material of the waveguide 700 and air. At the outer surface 715, light is reflected in accordance with Snell's law. If the angle of incidence ($\theta_i$) of the light ray 705 at the outer surface 715 is less than a threshold referred to as the critical angle ($\theta_c$), then the light ray 705 is reflected internally, with no light escaping. This phenomenon is known as total internal reflection. The critical angle depends on the index of refraction of the material of which the waveguide is composed relative to that of the material surrounding the waveguide, (e.g., air). For example, if the waveguide were made from acrylic, which has an index of refraction of approximately 1.5, and surrounded by air, the critical angle, $\theta_c$, would be:

$$\theta_c = \arc \sin(n_a/n_b) = \arc \sin(1/1.5) = 41.8$$

where $n_a$ is the index of refraction of air (1.0) and $n_b$ is the index of refraction of acrylic (1.5).

Figure 8A:
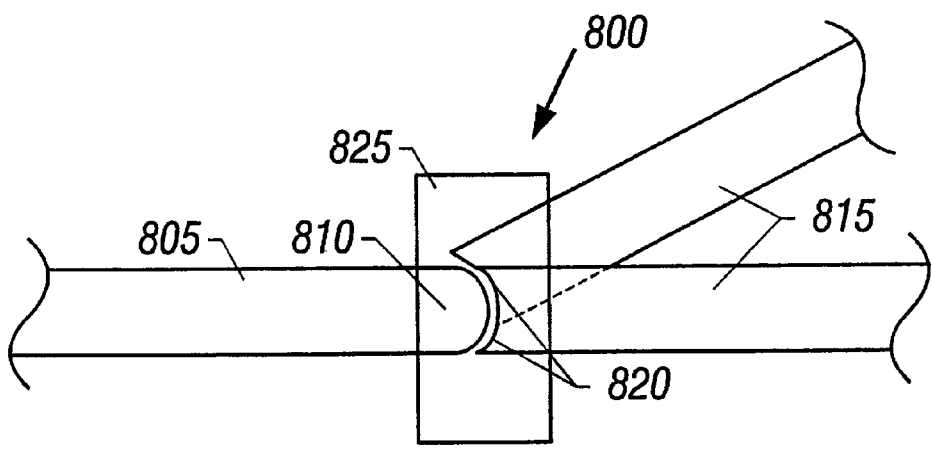
FIGS. 8A and 8B are side and bottom views of a waveguide joint.
Figure 8B:
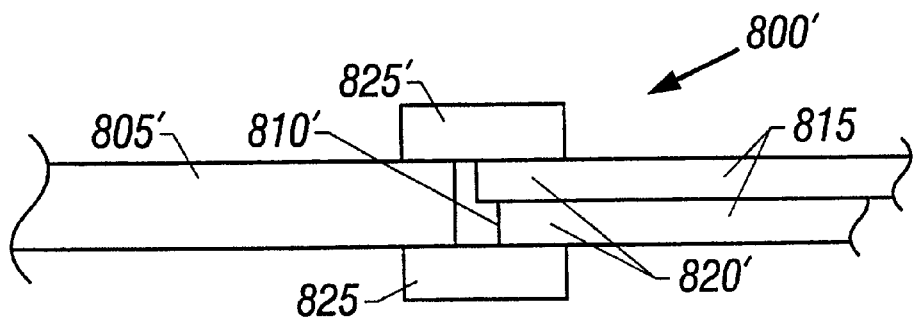

Referring to FIGS. 8A and 8B, a waveguide joint 800', may be used to distribute light in the DLS. For example, the joint may be used to provide light to a door of the vehicle. The waveguide joint 800', has a trunk section 805 with a convex curved end 810. Branch sections 815 having convex curved ends 820 adjoin the trunk section 805. The branch sections may be held in place by a plastic band 825', surrounding the joint region or by epoxy or snaps. Light input to the trunk section 805', is essentially split among the branches 815', The branches 815, may be positioned to carry light to different sections of the vehicle. With this configuration, it is possible to reconfigure the branches 815', in the event of design changes. Epoxy that has an index of refraction approximately equal to that of the waveguide, i.e., that is index-matched, may be used to hold the branches 815, in place. The joint 800', may have only a single branch 815', that is used to change the direction of the trunk 805' or to provide a hinged connection. A hinged connection using the joint 800 may be installed, for example, in a car door. Index-matched fluid may be used to lubricate and reduce discontinuity at the interface between the trunk 805', and the branch 815', which will reduce the loss through the joint 800.

Figure 9A:
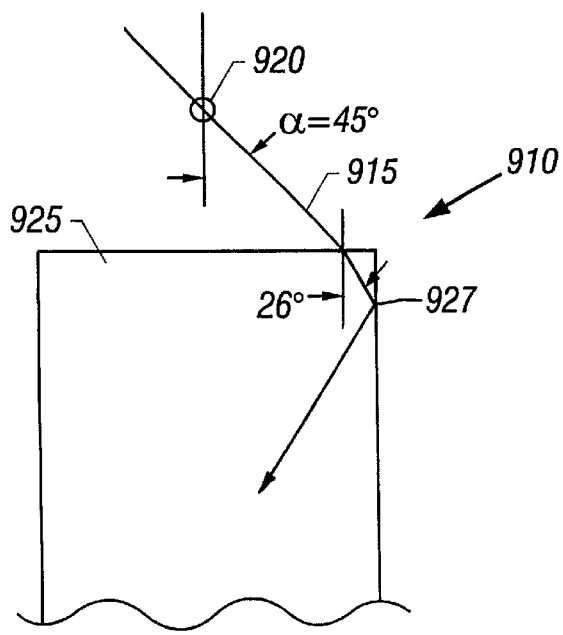
FIGS. 9A–9C are cross-section views of non-tapered and tapered waveguide inputs.
Figure 9B:
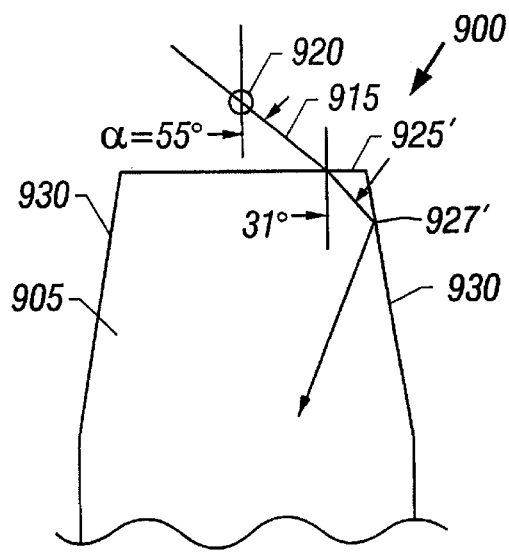
Figure 9C:
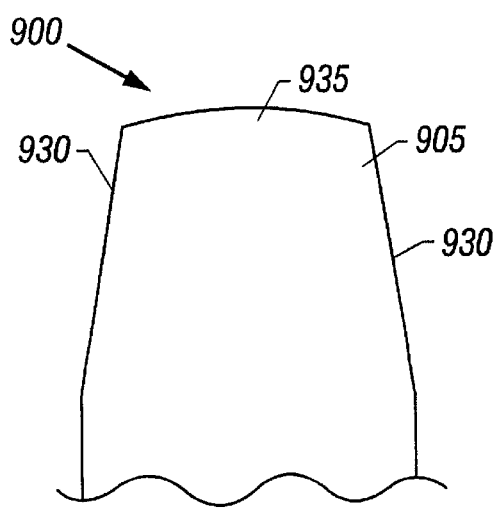

As shown in FIGS. 9A–C, a waveguide 900', may have a pinched end that acts as a collector element 905'. The collector element 905', increases the acceptance angle ($\alpha$) of the waveguide 900', and thereby increases light collection efficiency. The end of the waveguide 900 may be pinched in two dimensions to form an essentially trapezoidally shaped collector element 905. The collector element 905', may be formed on the end of a waveguide 900', having a cross-section that is rectangular, round, or other shapes.

For example, FIG. 9A shows a waveguide 910 without a pinched end. Light 915 from a light source 920 enters the waveguide 910 at an angle of 45°. At the input face 925, the light is bent in accordance with Snell's Law to form an angle of 26° with respect to a direction perpendicular to the input face 925. The light reaches the outer edge 927 of the waveguide at an angle of 26° and is confined within the waveguide by internal reflection.

FIG. 9B shows a waveguide 900 with a pinched end. Light enters the input face at an angle of 55°. Hence, the acceptance angle of the pinched waveguide 900 can be made greater than the acceptance angle of the waveguide 910 without the pinched end. At the input face 925', the light is bent to form an angle of 31° with respect to a direction perpendicular to the input face 925'. The light reaches the outer edge 927' of the waveguide at an angle of 26° (since the inclined walls 930 of the pinched portion are angled inward by 5°) and is confined within the waveguide by internal reflection.

As shown in FIG. 9C, the pinched end of the waveguide 900' may be formed so that an excess of material at the tip of the waveguide 900' bulges outward to form a lens 935 with a desired focal length. The lens 935 focuses received light, further increasing the acceptance angle of the waveguide 900.

Figure 10A:
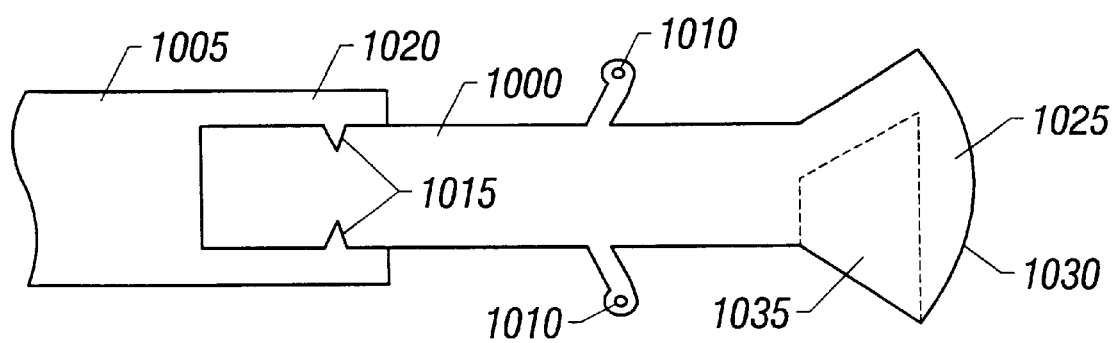
FIGS. 10A and 10B are cross-section views of waveguide sections having integrated installation components and an integrated output structure.

The waveguides may be formed as a set of standard components that may be easily interconnected and used as building blocks for different applications. For example, FIG. 10A shows waveguides 1000 and 1005 having integrated installation elements, such as snaps 1010 and detents 1015. Snaps 1010 can be formed during the injection molding of the waveguide 1000 and provide a convenient means for securing the waveguide 1000 within the vehicle. The snaps are sized and angled to minimize light loss through the snap. For example, the snap may form a 60° angle with the waveguide (toward the direction that light is travelling through the waveguide). The vehicle may have brackets to receive the snaps 1010 or a screw may be inserted into a snap 1010 to secure the waveguide to a mounting surface. The detents 1015 enable the waveguide 1000 to be securely connected to another waveguide 1005 having an integrated claw structure 1020. Each waveguide may be formed with a detent 1015 at one end and a claw structure 1020 at the other.

Figure 10B:
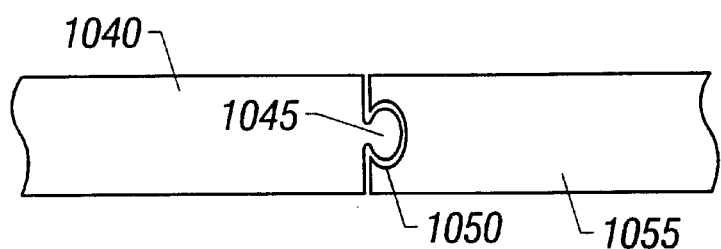

FIG. 10B shows waveguides with integrated connection elements. A waveguide 1040 may have a key 1045 formed at one end. The key 1045 is configured to mate with a socket 1050 of another waveguide 1055. These connection elements may cause a loss of approximately 4% at each interface, however, the connection elements increase the ease with which waveguide components can be installed. Index-matched epoxy or fluid may be used at the interface to secure the connection and reduce losses.

In addition to the installation and connection elements, the waveguide 1000 widens at one end into a conical output element 1025 having a convex curved surface 1030. The curved surface 1030 of the output element 1025 essentially acts as a lens to provide a desired light output characteristic. The output element 1025 may form an illumination element for the vehicle, e.g., a courtesy light in the door of a vehicle. A portion of the widened waveguide end may be eliminated, leaving an air gap 1035, while maintaining desired output characteristics. The air gap 1035 decreases the weight and cost of the waveguide 1000.

Figure 11:
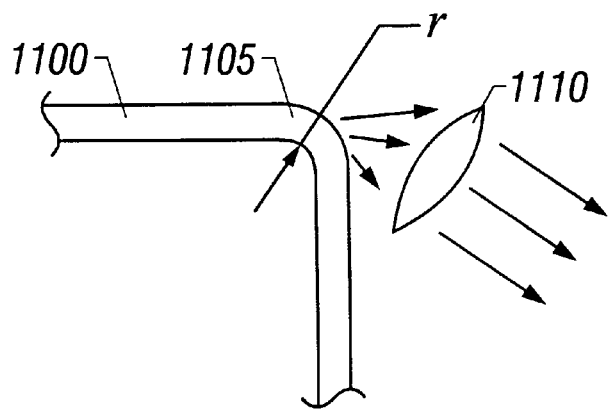
FIG. 11 shows a leaky waveguide bend and focusing lens.

Another configuration for an output element is shown in FIG. 11. A waveguide 1100 has a bend 1105 that is configured to allow a portion of the light travelling in the waveguide to escape at the bend 1105. A lens 1110 may be used to focus the light to form a desired beam pattern. The amount of light released at the bend 1105 (or reflected back toward the input) can be controlled by determining the inner radius (r) of curvature of the bend 1105 relative to the width (w) of the waveguide 1100. For example, a bend with a inner bend radius to waveguide width ratio (r/w) of 3:1 will result in a loss of less than 5% of the total light in the waveguide (the losses including light released at the bend and light reflected back toward the input). A bend ratio of 1:1 will result in a loss of approximately 30–35%, and a bend ratio of 0.1:1 will result in a loss of approximately 65–70%. Not all of the light lost in the waveguide enters the lens, however the amount of light entering the lens will be proportional to the amount of light released at the bend.

Figure 12A:
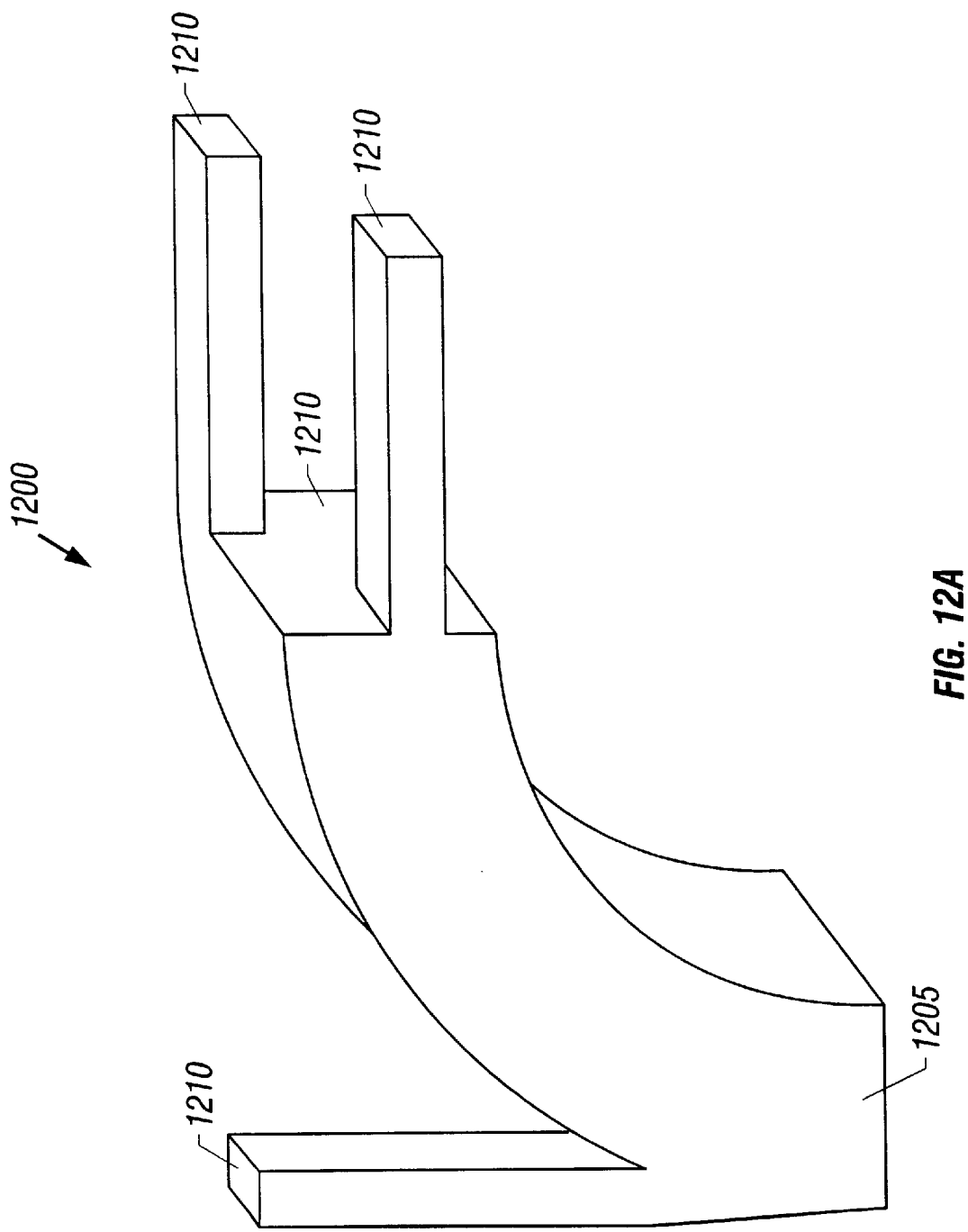
FIGS. 12A and 12B show cross-section views of optical manifolds.
Figure 12B:
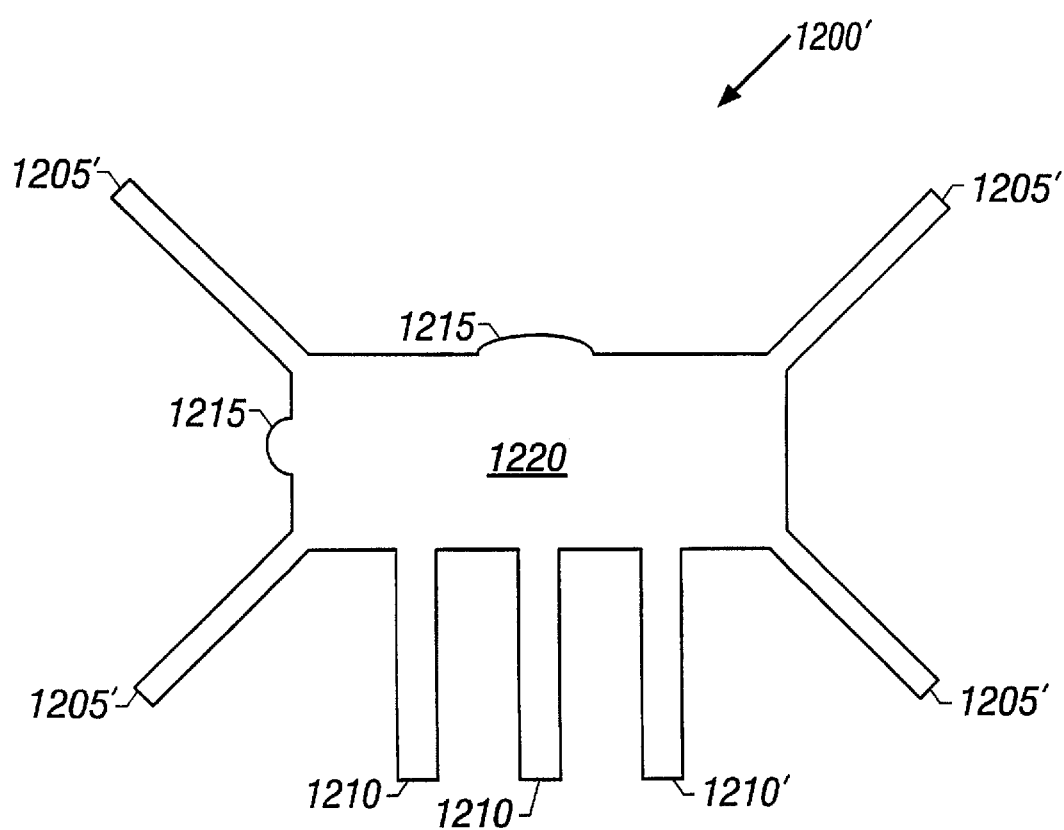

An optical manifold 1200, as shown in FIGS. 12A and 12B, is another useful building block for a DLS. Light enters the optical manifold 1200 through one or more inputs 1205 and is split to one or more of the output arms 1210. Alternatively, light may enter through one or more output arms 1210 and exit through the inputs 1205. The output arms 1210 may branch off at multiple points from the optical manifold in multiple directions to direct light to other subsystems of the DLS in various locations within the vehicle. The size of the output arms 1210 and their locations determines the proportion of the light input to the manifold that is split to each arm.

As shown in FIG. 12B, the optical manifold 1200' may include integrated output elements 1215. The output element 1215 may be lens-like structures that provide lighting functions within the vehicle, such as a reading lights or dashboard lights. The manifold 1200' may have multiple input 1205' and output arms 1210' and a portion 1220 where light from the various inputs is combined. Each input and output may use colored filters to achieve desired lighting effects.

A DLS may incorporate optical waveguide structures that provide an integrated structure for collecting and distributing light from a light source. As shown in FIGS. 13A–13H, a waveguide collar 1300 collects light from a light source 1310 and divides the light among output arms 1320 that extend from the light source 1310. The arms lie in an azimuthal plane relative to the light source.

Figure 13A:
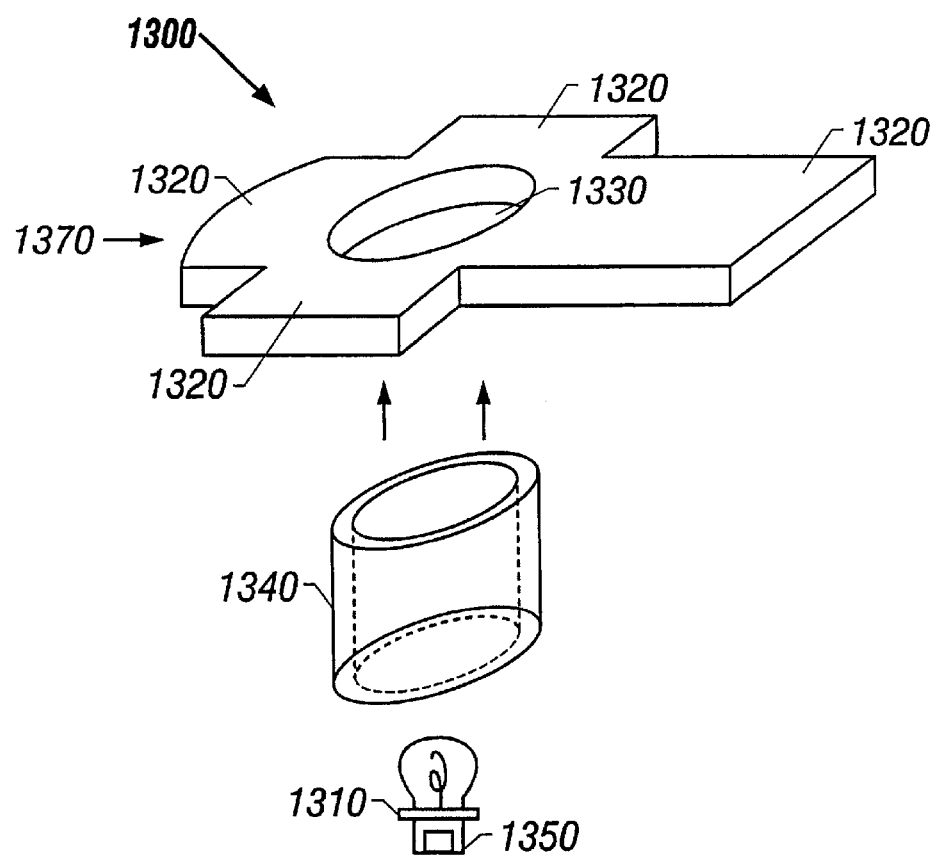
FIGS. 13A–13H show waveguide collars with four arms and a light source with a cylindrical sleeve.

For example, as shown in FIG. 13A, the waveguide collar 1300 is a planar structure in the shape of a cross. The collar 1300 has four output arms 1320 and an opening 1330 in the center for accommodating a light source 1310, although the number of arms may vary. The light source 1310 may be enclosed in a cylindrical sleeve 1340, which is inserted into the opening 1330 in the waveguide collar 1300. Light from the light source passes through the sleeve 1340 into the collar 1300, where it is divided into the output arms 1320. The cylindrical sleeve 1340 may be used with any of the waveguide collar configurations discussed below. Several waveguide collars 1300 may be stacked on a single sleeve 1340 to form a multi-layer structure. In addition, the cylindrical sleeve 1340 may be connected to or integrated with the base 1350 of the light source as discussed below.

Figure 13B:
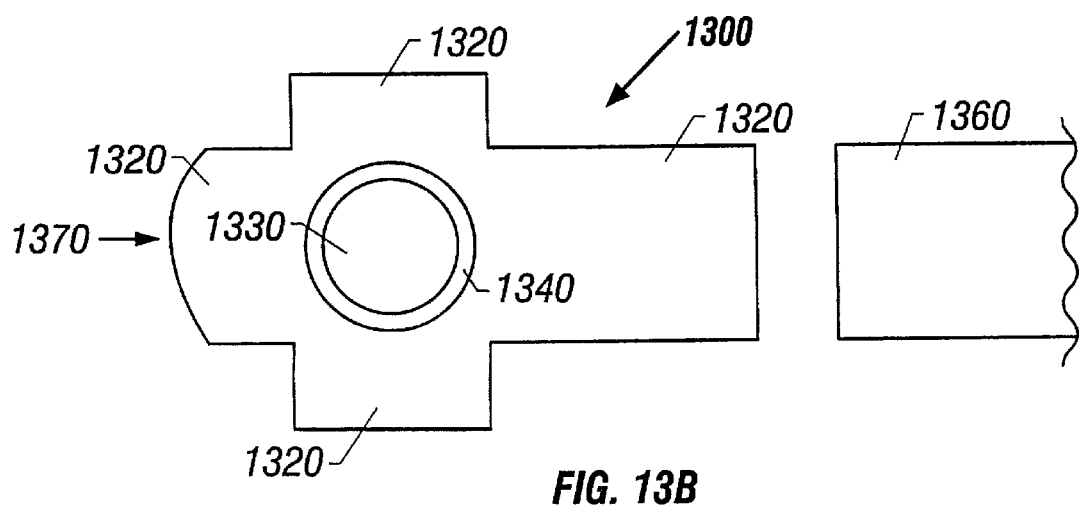

The output arms 1320 of the waveguide collar 1300 may be connected to other components in the DLS or may have integrated output elements, such as a lens 1370. The lens 1370, which is located at the end of the output arm 1320, transmits light away from the waveguide to provide illumination for the interior or exterior of the vehicle. Waveguides 1360 may be connected to the output arms 1320, as shown in FIG. 13B. Integrated installation elements, such as the snaps, claws and detents described above with respect to FIGS. 10A and 10B, may be used to connect the waveguides to the output arms.

Figure 13C:
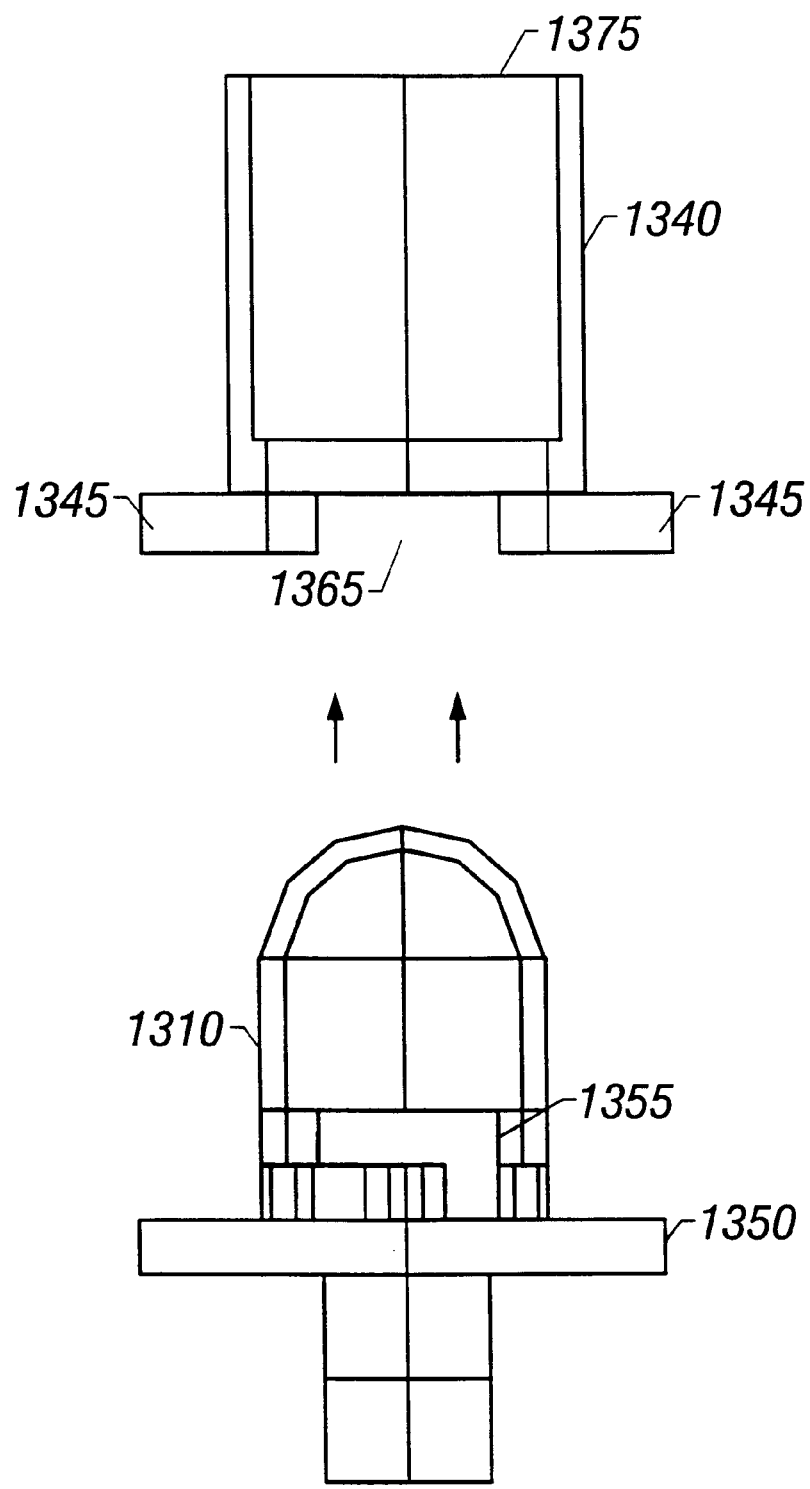
Figure 13D:
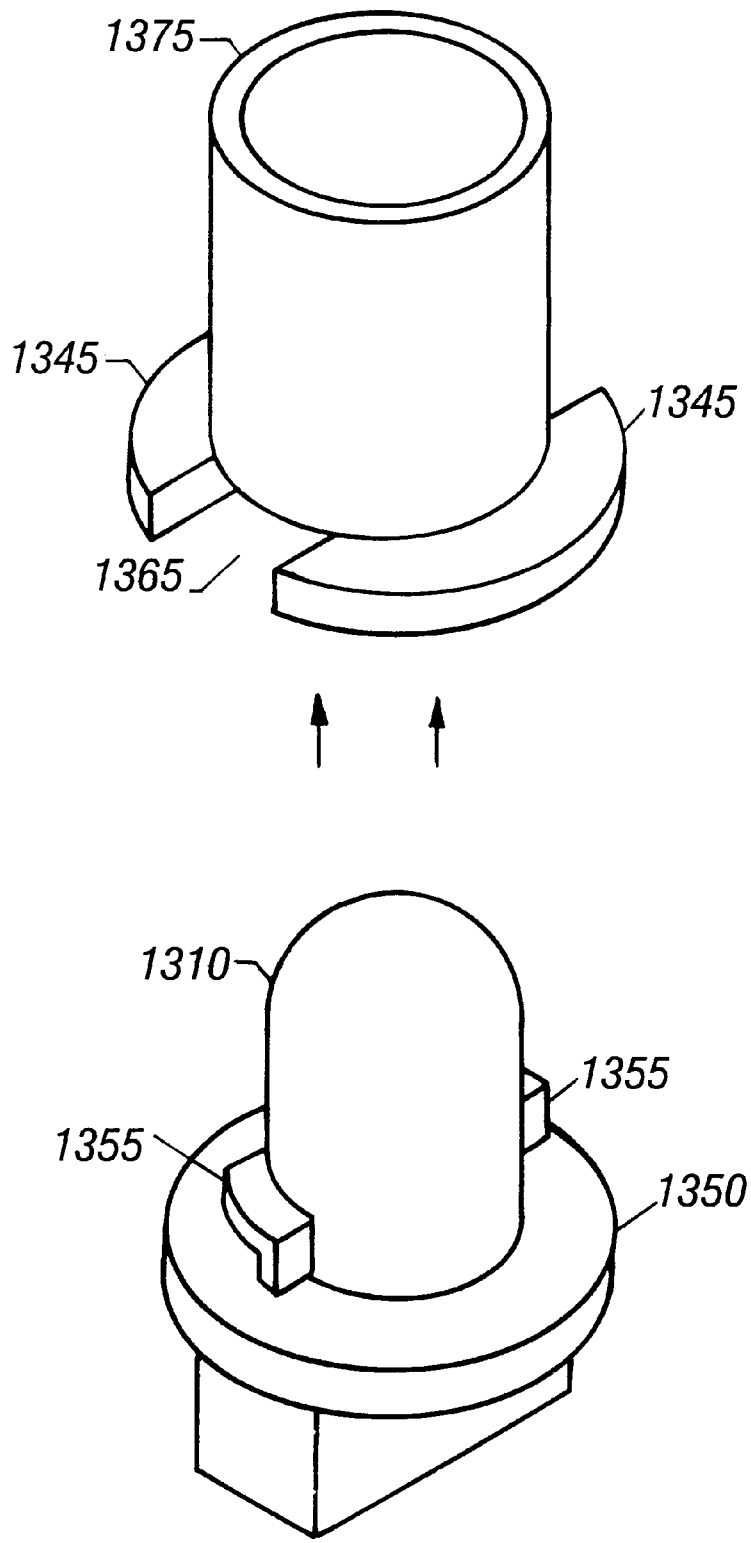
Figure 13E:
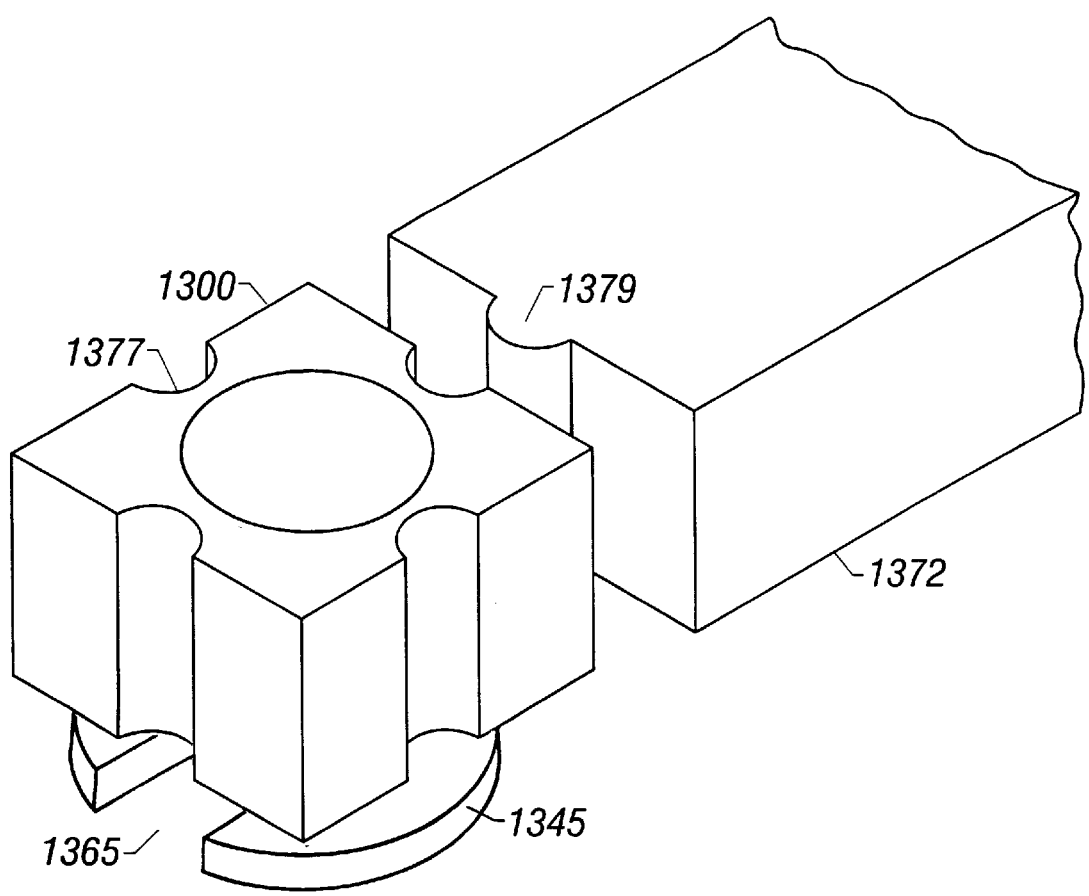
Figure 13E:
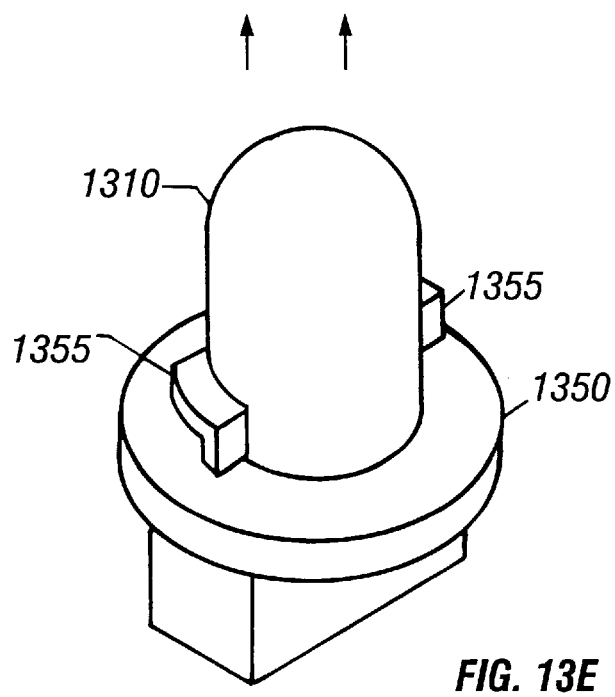

As shown in FIGS. 13C and 13D, the cylindrical sleeve 1340' may have a rim 1345 for connection to the lamp base 1350. The lamp base has locking tabs 1355 which may be inserted into the gap 1365 between the rim 1345 portions of the sleeve 1340. The lamp base is twisted so the locking tabs engage the rim 1345 and hold the light source 1310 in place within the sleeve 1340'. Alternatively, as shown in FIG. 13E, a waveguide collar 1300' may have an integrated rim 1345' for connection to a lamp base 1350. The collar may have alignment notches 1377 configured to accommodate alignment tabs 1379 on the end of a connecting waveguide 1372.

Figure 13F:
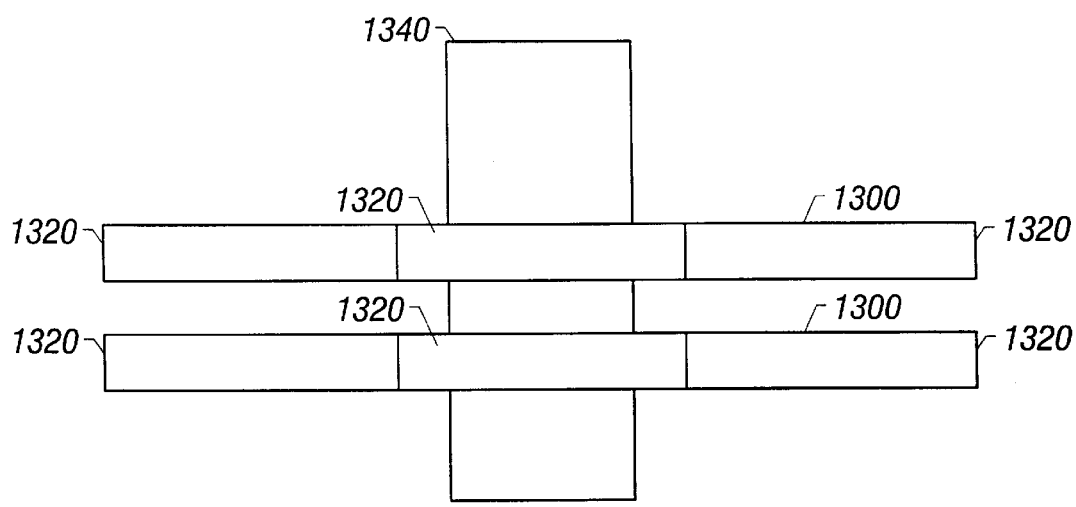

The sleeve 1340' provides several advantages. For example, as shown in FIG. 13F, multiple waveguide collars 1300', can be stacked on a single sleeve 1340', allowing light to be distributed through multiple collars 1300' with a single light source 1310. Such a configuration increases system design flexibility.

In addition, the upper portion of the sleeve 1340', reflects a portion of the light from the light source 1310 through internal reflection so that the light exits from the top 1375 of the sleeve. Light entering the sleeve at an angle less than the critical angle passes through the sleeve and enters the waveguide collar 1300', (the angle being measured with respect to a direction perpendicular to the sleeve wall). Light entering the sleeve at an angle greater than the critical angle is internally reflected by the sleeve. In this manner, the sleeve forms a hybrid lighting system that allows the light source 1310 to function as a source for both a direct lighting function (through the top of the sleeve) and a distributed lighting function (through a network connected to a waveguide collar).

Figure 13G:
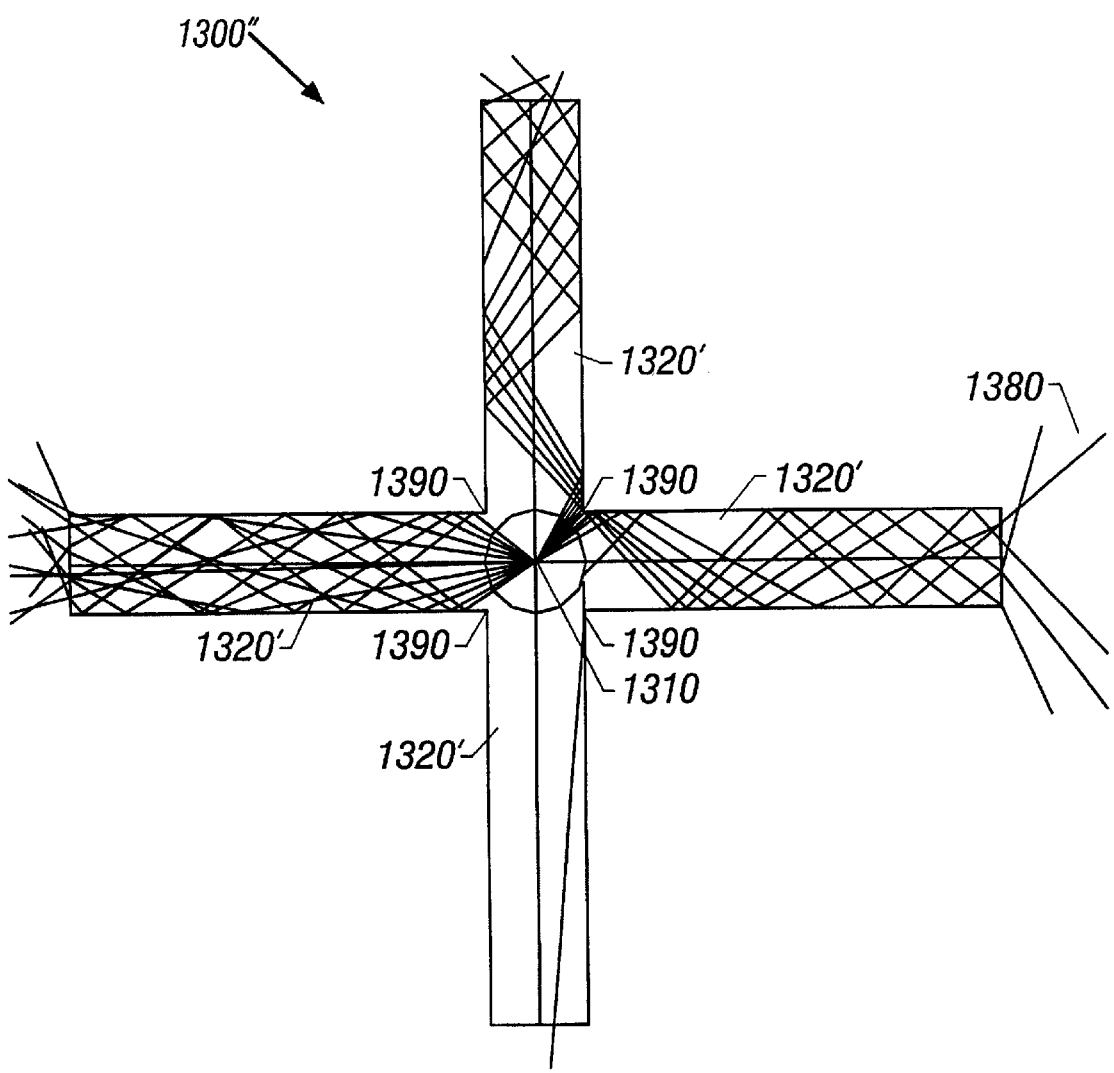
Figure 13H:
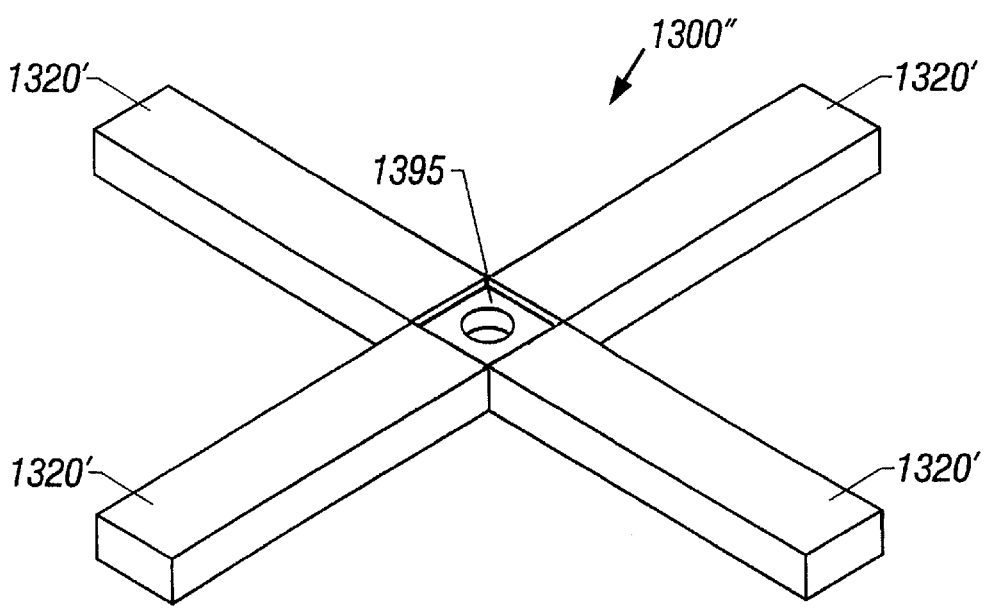

FIG. 13G shows a light ray 1380 diagram for a four-arm waveguide collar 1300". For reasons of clarity, only a portion of the light rays 1380 from the light source 1310 are traced in the diagram. Ordinarily, light emanates uniformly from the light source 1310 in the plane of the waveguide collar (the azimuthal plane). The waveguide collar collects light from the light source and divides it among the four output arms 1320'. In this example, the vertices 1390 are positioned relative to the light source 1310 so that essentially all of the light collected is distributed into one of the output arms 1320', i.e., light does not escape at the vertices 1390. FIG. 13H shows a perspective view of a four-arm waveguide collar 1300". The central portion 1395 may be tapered or stepped to improve the light collection efficiency with respect to the light source.

Figure 14A:
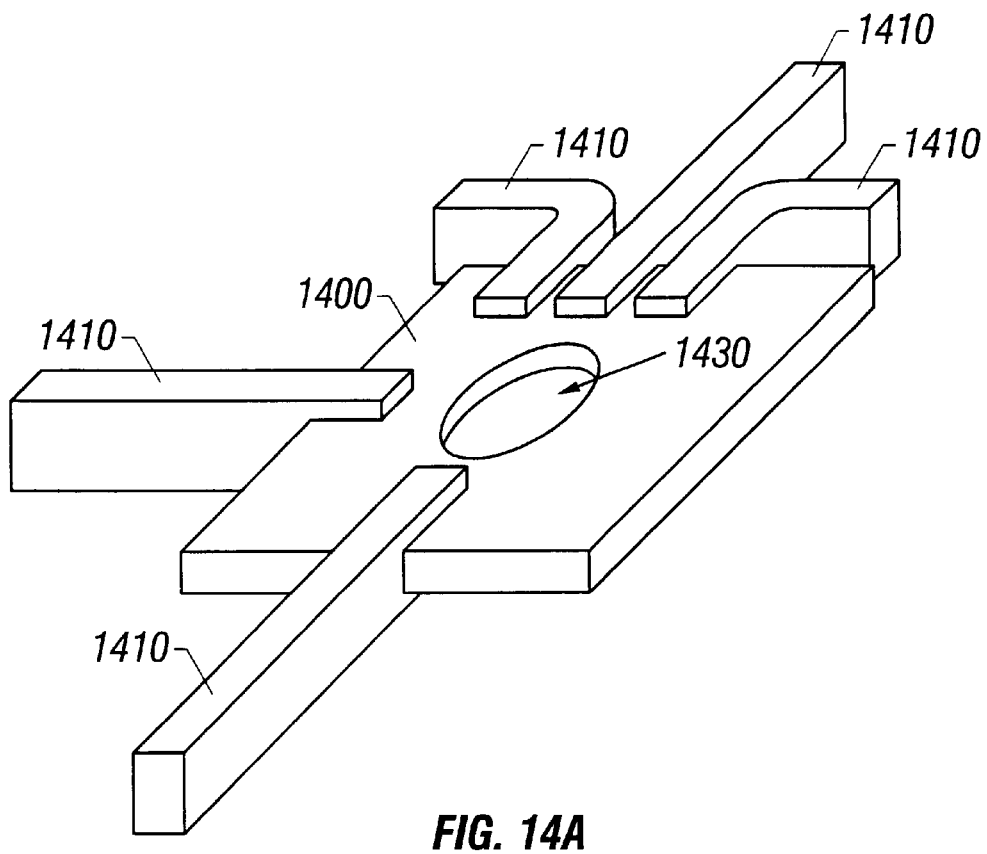
FIGS. 14A–14B show alternative configurations of a waveguide collar.
Figure 14B:
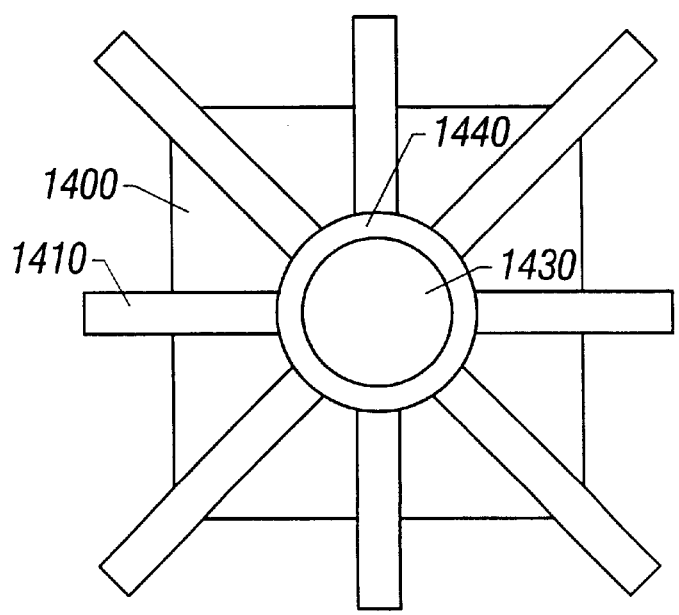

FIGS. 14A and 14B show alternative configurations of the waveguide collar 1400'. The collar 1400', is a planar structure that surrounds and collects light from a light source (not shown) positioned in an opening 1430 in the center of the collar 1400'. Waveguides 1410 may be mounted on the top surface of the collar 1400', or may be embedded in the collar as shown in FIG. 14A. The waveguides 1410 may be positioned radially with respect to the light source, as shown in FIG. 14B. A cylindrical sleeve 1440 may surround the light source, as described above. The collar 1400', serves as a hybrid lighting element by providing both a direct lighting function (in the direction perpendicular to the plane of the collar) and a distributed lighting function (through the connected waveguides).

Figure 15:
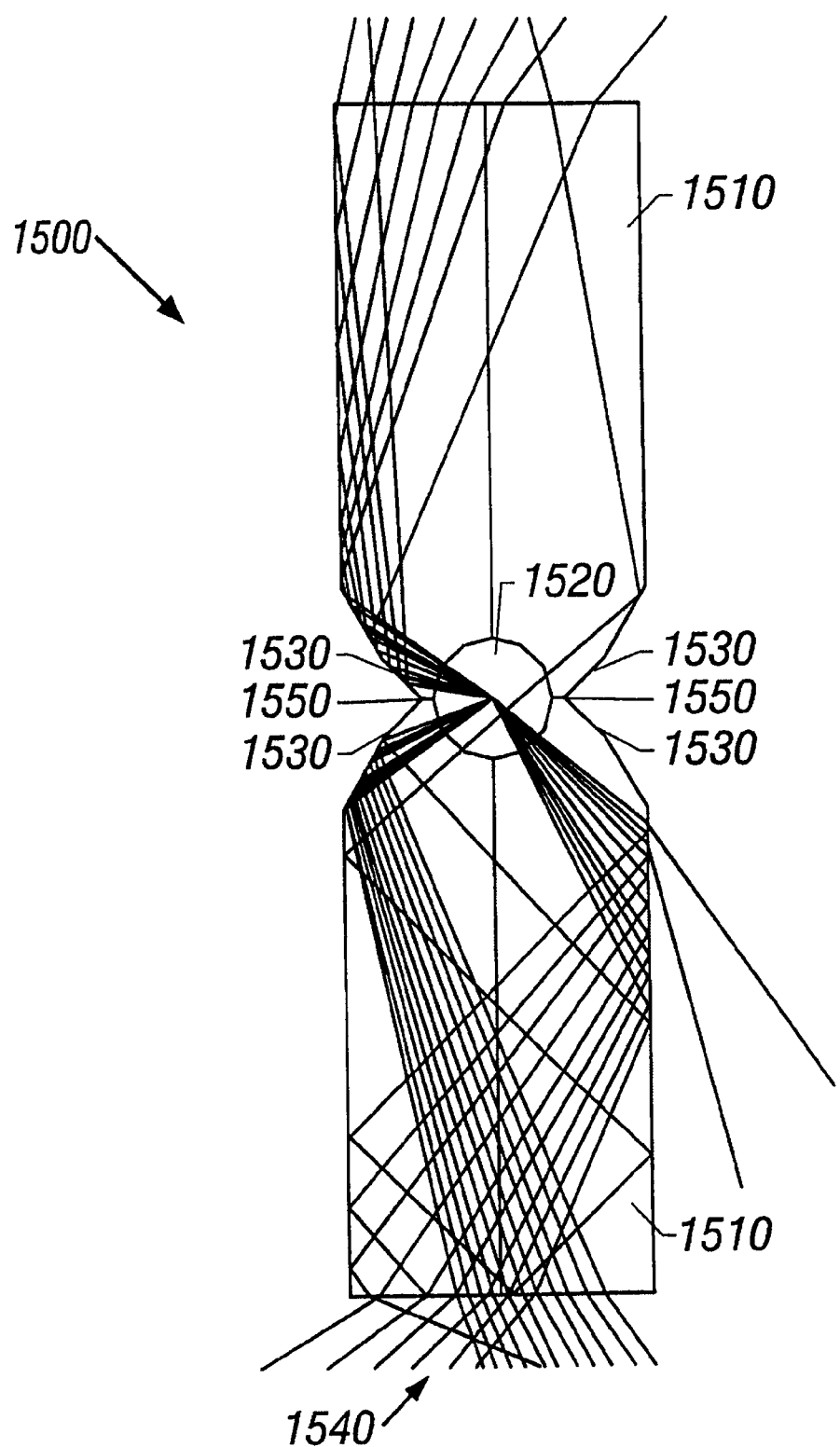
FIG. 15 is a waveguide collar with two arms.

FIG. 15 shows another alternative configuration of the waveguide collar 1500. The collar has two arms 1510 that extend from opposite sides of the light source opening 1520. The sides of the output arms include convex, curved surfaces 1530 at the center of the collar 1500. As shown by the light ray tracings 1540, the curved surfaces 1530 at the vertices 1550 improve light collection by reflecting light that would have been transmitted out of the sides of the collar (if the sides were not curved) and directing the light into the two output arms.

Figure 16A:
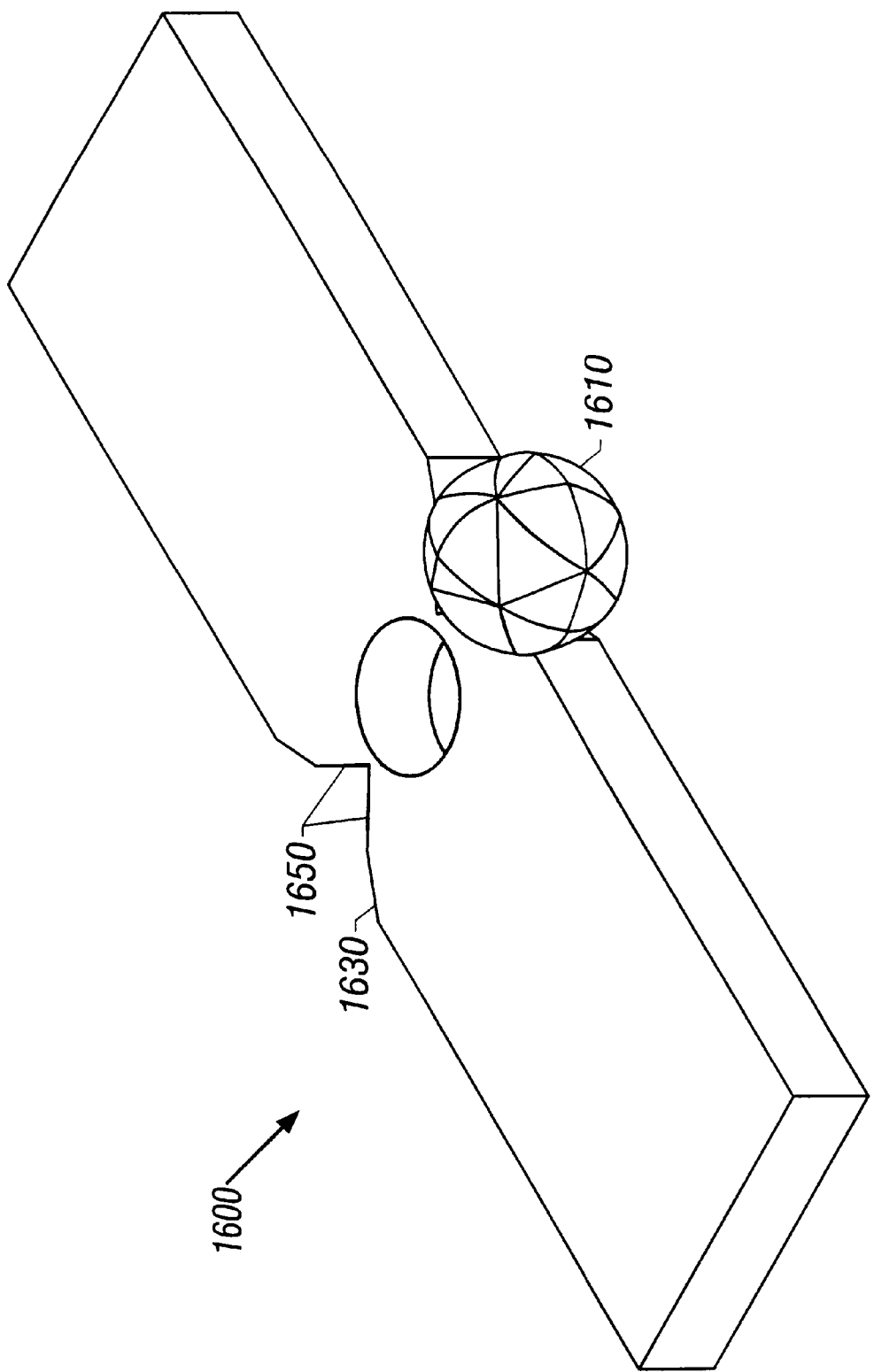
FIGS. 16A–16B show waveguide collars with two arms and integrated output lenses.
Figure 16B:
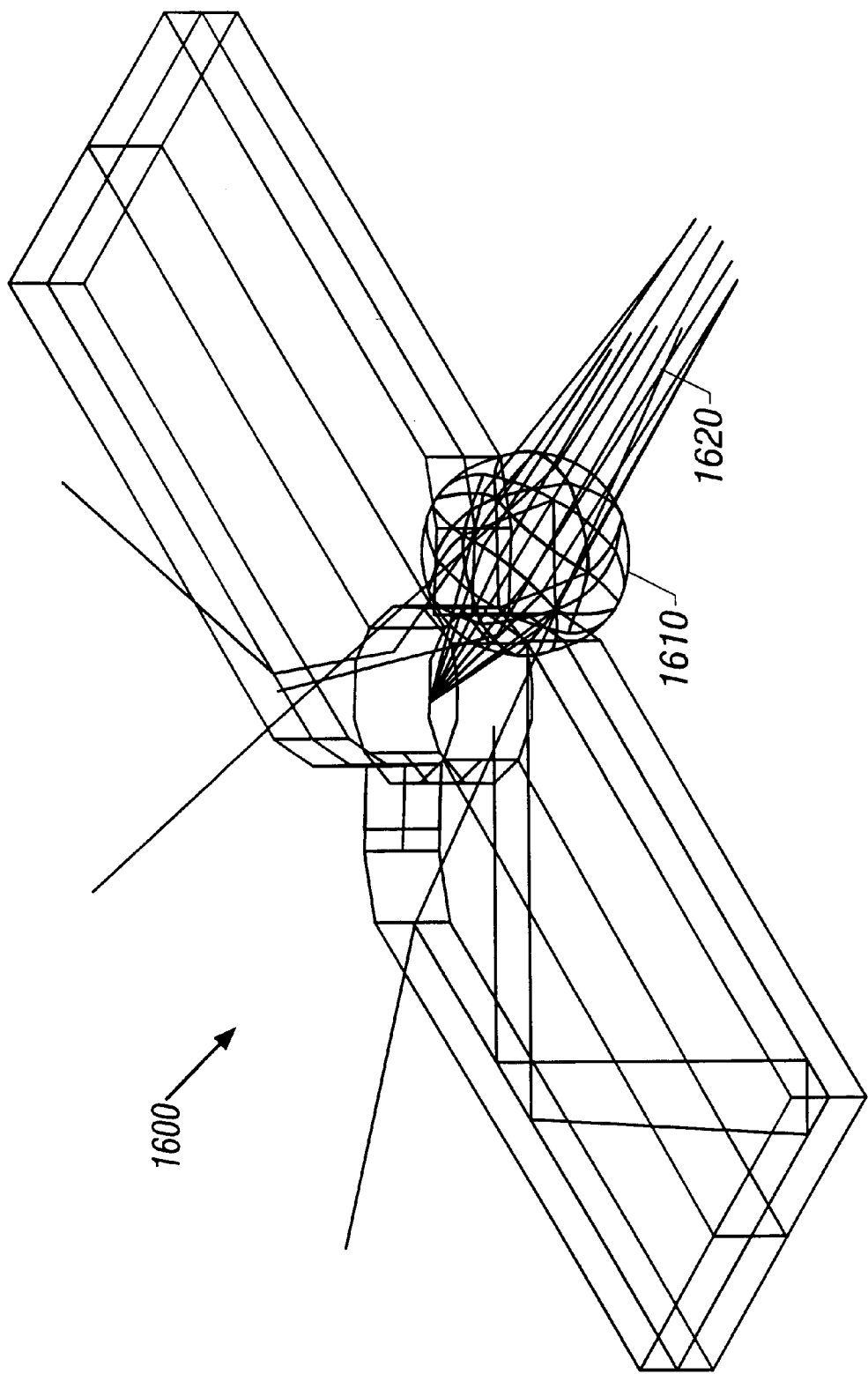

As shown in FIGS. 16A and 16B, optical components, such as lens 1610, may be positioned at the vertices 1650 of the curved surfaces 1630. The lens 1610 may be formed along with the rest of the waveguide collar in a single injection molding step. The lens 1610 may have a variety of shapes: cylindrical, spherical, parabolic, Fresnel, polyhedral, etc. The lens 1610 receives light through the side facing the light source, focuses light through internal reflection and outputs the light through the opposite side. The output light rays 1620, as shown in FIG. 16B, are focused and, as such, tend to converge at some distance from the lens 1610.

Figure 17:
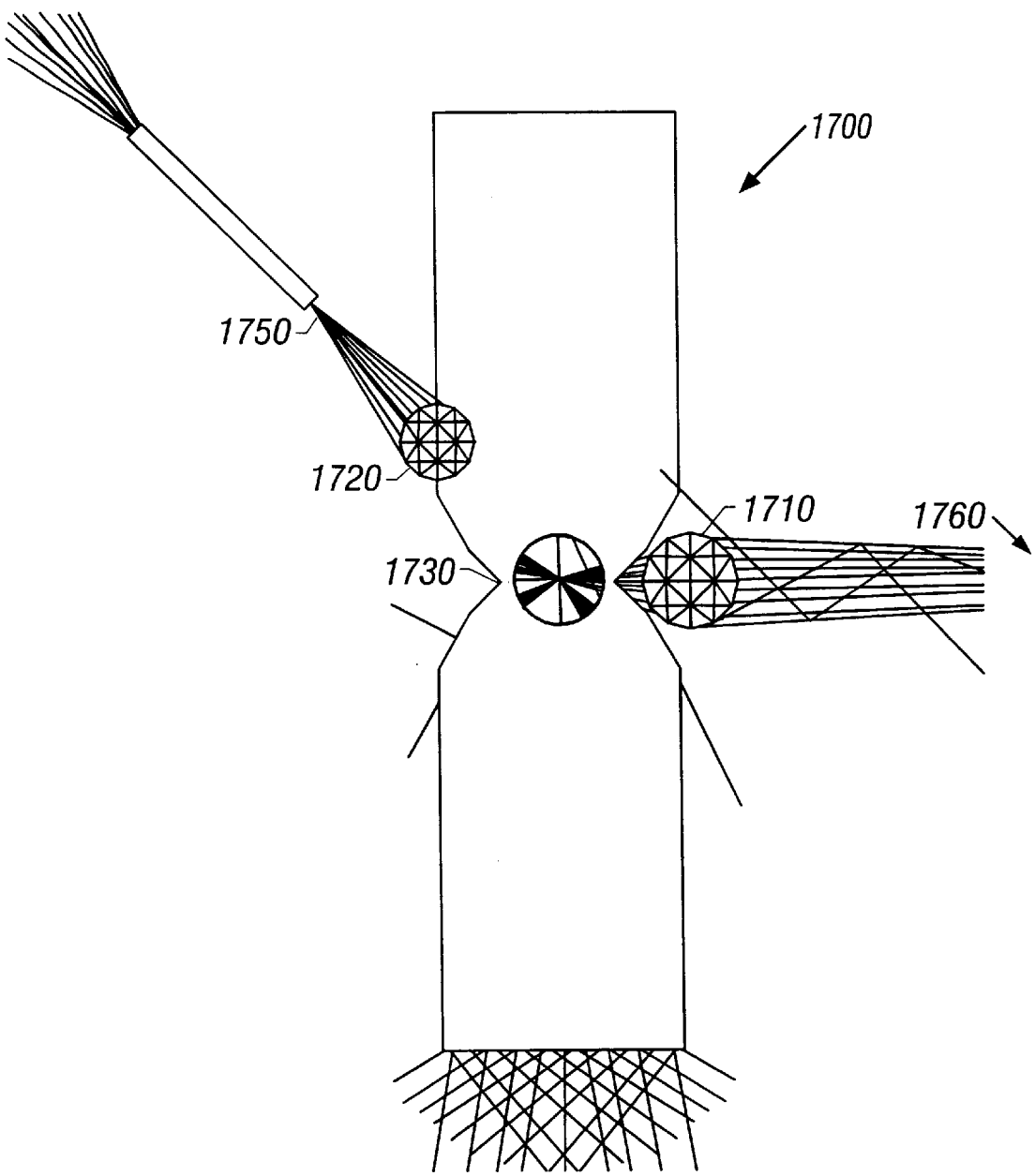
FIG. 17 is a light ray diagram for a waveguide collar with two arms and two output lenses.

As shown in FIG. 17, a lens 1720 also may be positioned at points on the waveguide collar other than the vertices 1730. The light output by the lenses 1710 and 1720 may be focused, for example, on the input of a waveguide 1750 or on a target location 1760 on the interior or exterior of a vehicle, such as a keyhole. The molded integral lenses provide several advantages. For example, a waveguide collar with a lens serves as a hybrid lighting element, i.e., the collar performs both a direct lighting function and a distributed lighting function. In addition, system complexity and manufacturing costs may be reduced by having a one-step, injection molding manufacturing process.

Waveguide collar assemblies may be combined with integrated optical components, as shown in FIGS. 18A–18E, to form a modular DLS 1800. The modular system provides flexibility and increased efficiency in DLS design and decreases system complexity and manufacturing costs. The modular system also makes it easier to provide light source redundancy.

The DLS 1800 includes three light sources 1805, 1810 and 1815 with waveguide collars and integrated molded lens outputs. The first light source 1805 is positioned within a four-arm waveguide collar. The ends of the first 1820 and second 1825 arms split into separate outputs that connect to other waveguides 1830 or terminate in light output elements, such as molded lenses 1835 or open-ended waveguides 1840. The third arm terminates with an integrated molded lens output 1845.

Figure 18A:
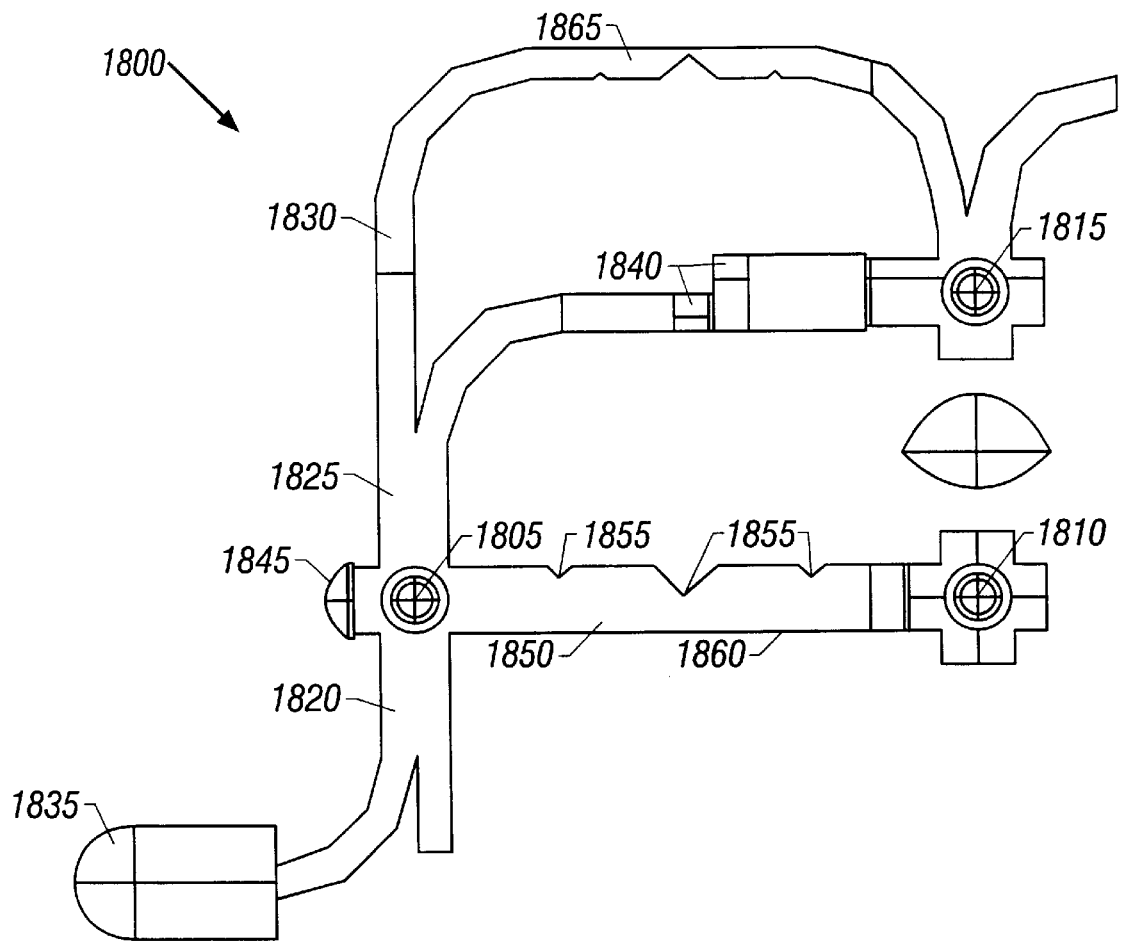
FIGS. 18A–18E are views of a modular distributed lighting system.
Figure 18B:
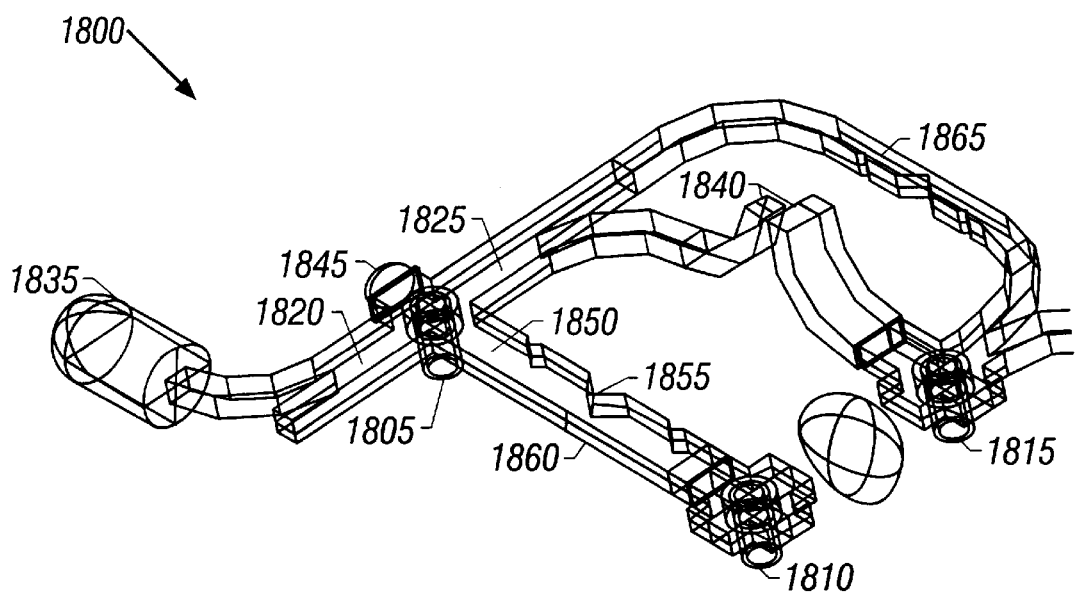
Figure 18C:
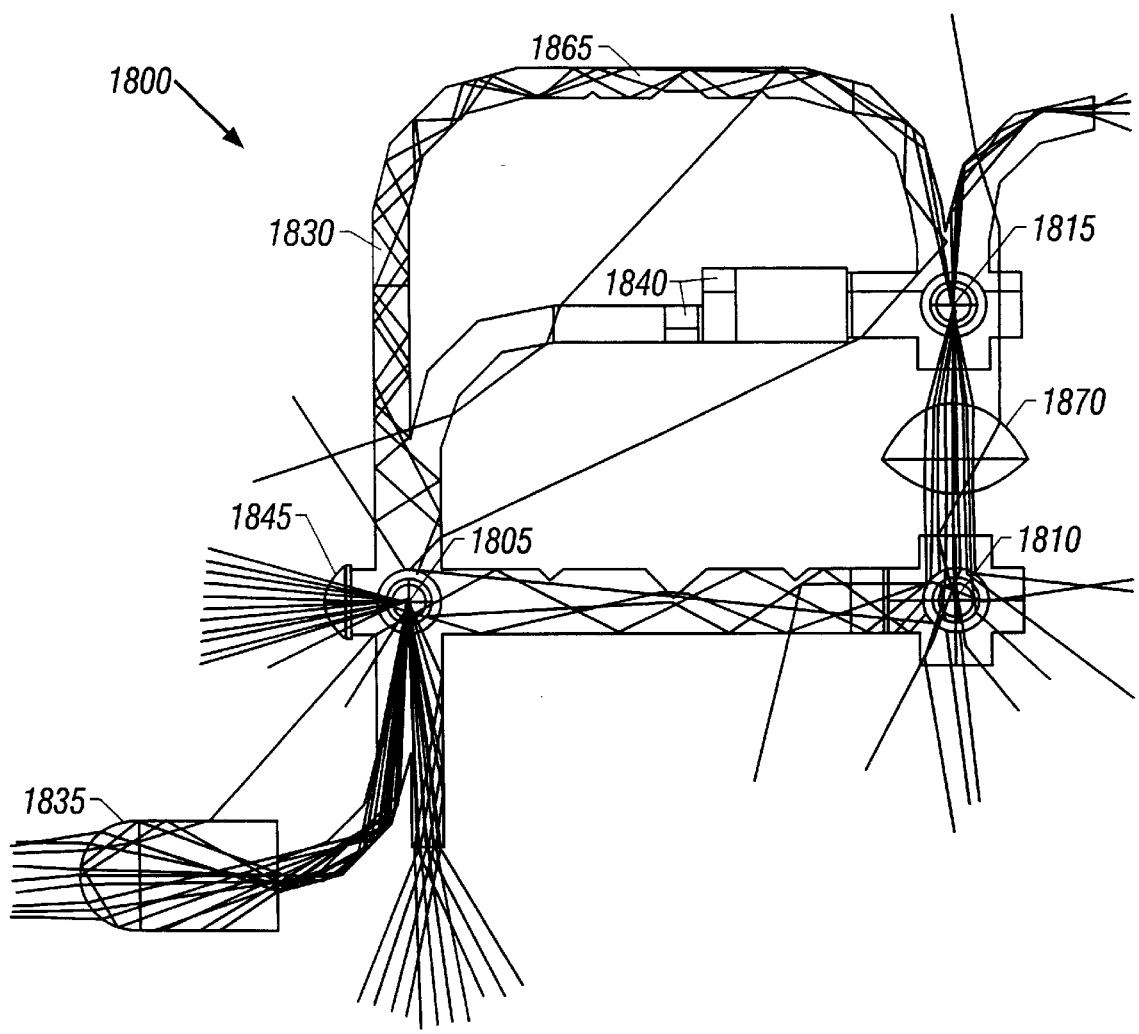
Figure 18D:
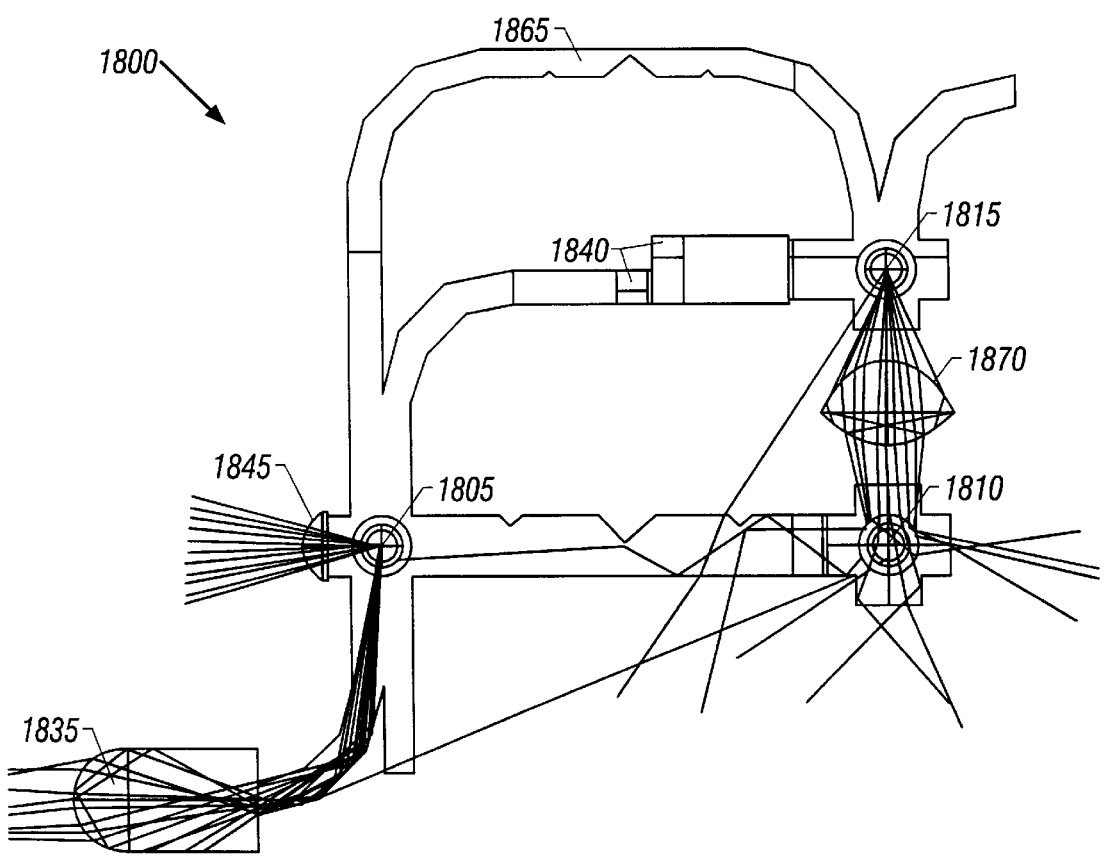
Figure 18E:
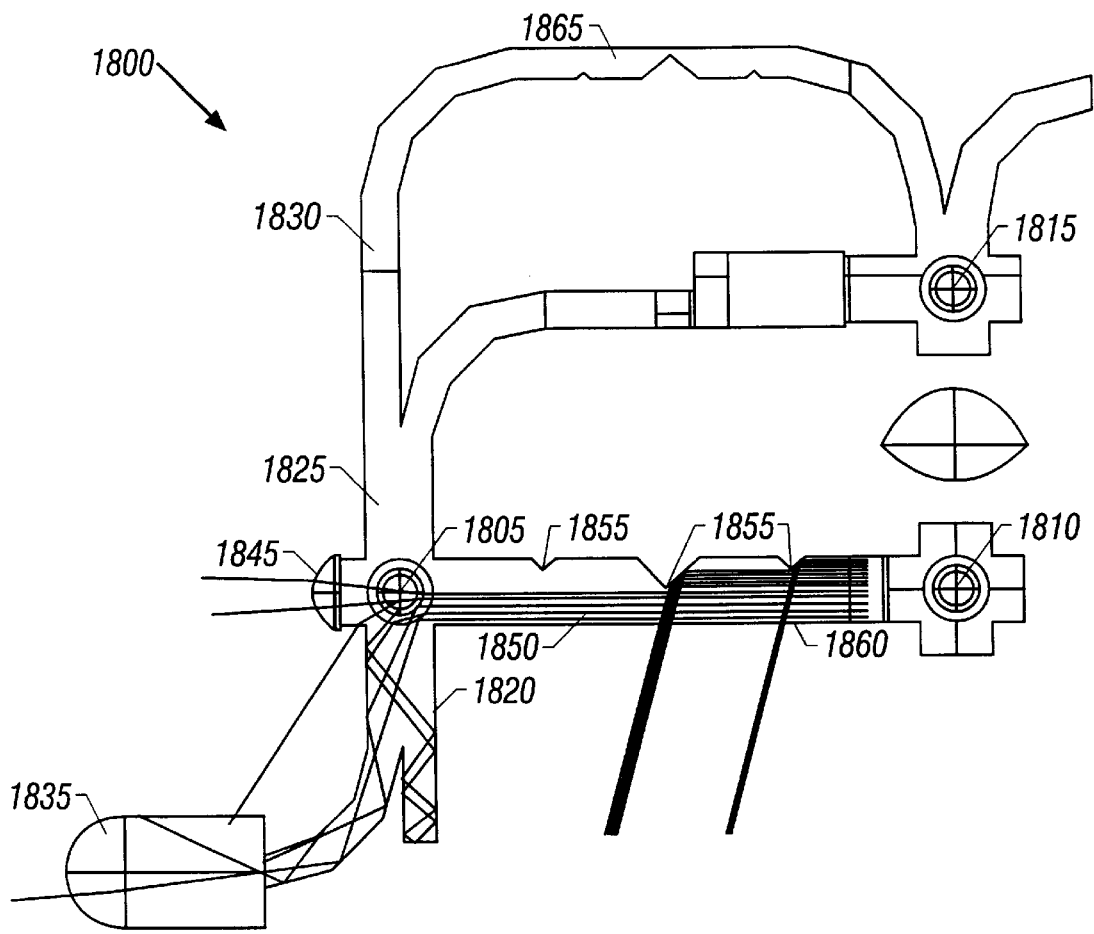

The fourth arm 1850 includes scattering notches 1855 to cause light to be transmitted from the side 1860 of the waveguide, as shown in FIG. 18E. Another waveguide 1865 in the system has similar scattering notches. The fourth arm 1850 terminates at a second light source 1810 that is positioned in a waveguide collar. The waveguide collar may be connected to the output arm with integrated snaps or attached with index-matched epoxy.

As shown in FIGS. 18C and 18D, a lens 1870 is positioned between the second and third light sources 1810, 1815. The lens 1870 focuses light output by the third source 1815 so that it can be received by the waveguide collar housing the second source 1810. The received light is distributed by the waveguide collar housing the second source. If the second light source 1810 were to fail, the components attached to the second light source 1810 would still receive light. Hence, the configuration provides light source redundancy. Alternatively, the second and third sources could be connected by a waveguide.

Figure 19:
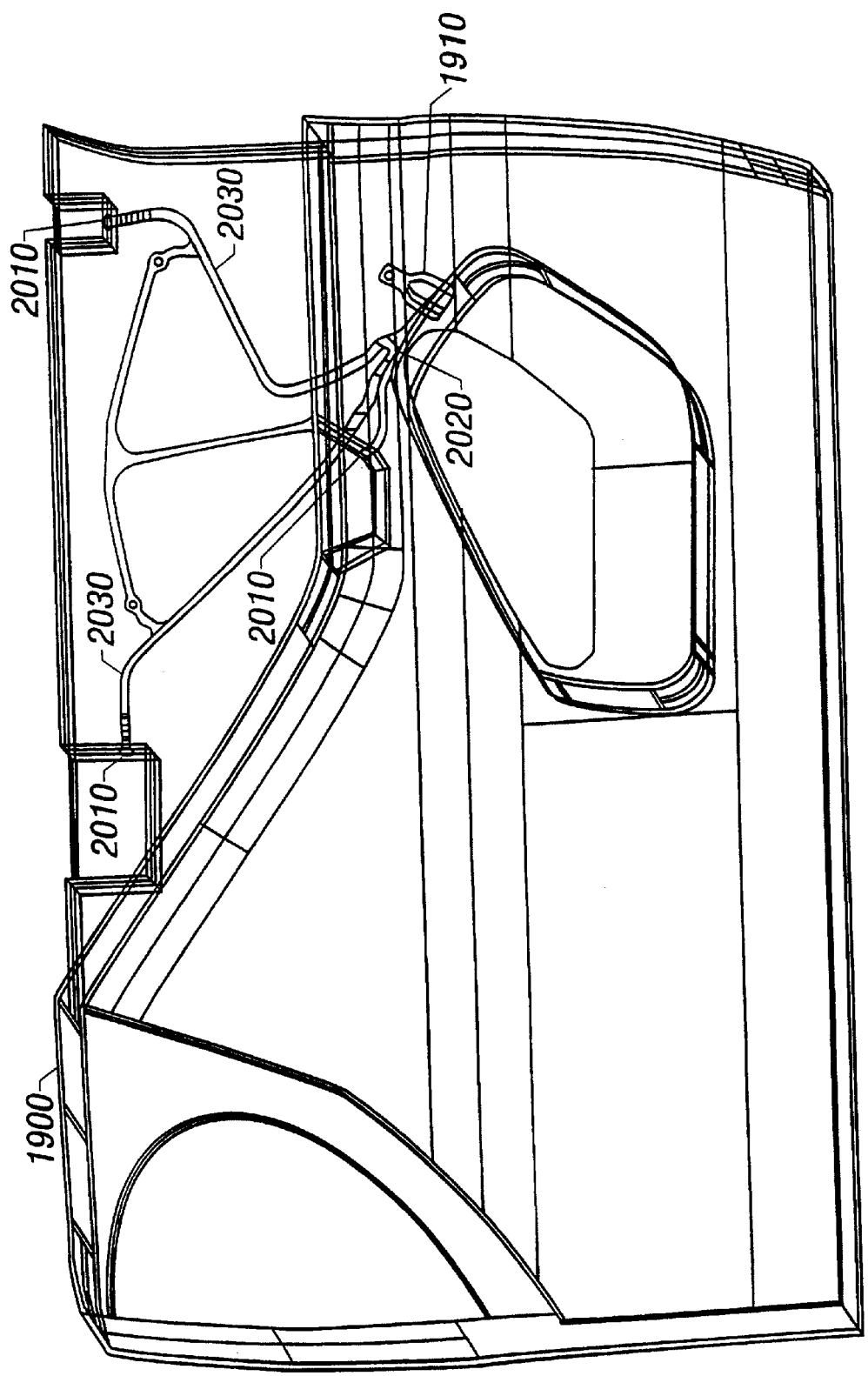
FIG. 19 is a vehicle door panel with a distributed lighting system.
Figure 20B:
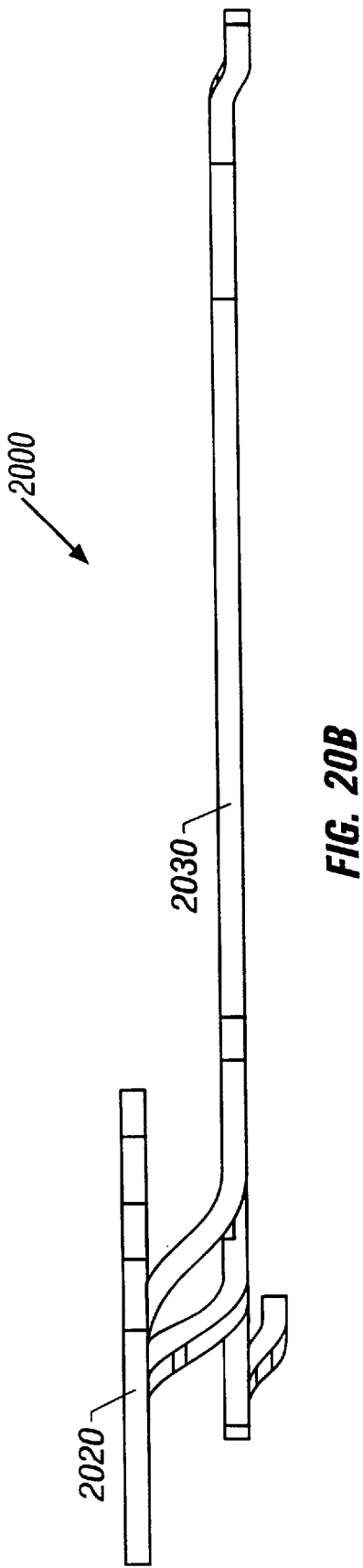
FIG. 20B is a side view of a vehicle door panel waveguide assembly.

A DLS may be used in a vehicle door panel 1900, as shown in FIG. 19, to distribute light from a light source 1910 to lighting outputs 2010 for the vehicle door. As shown in FIGS. 20A and 20B, a trunk waveguide 2020 splits light from the light source 1910 into branch waveguides 2030 that propagate the light to the lighting outputs 2010 of the door panel 1900.

A variety of output structures may be used at the lighting outputs 2010. For example, a waveguide may have a conical end portion (as shown in FIG. 10) with a lens element. A leaky waveguide bend (as shown in FIG. 11) also may be used.

The waveguide assembly 2000 is supported on the door panel 1900 by an intersecting web of support arms 2040 that extend between the waveguides 2030. The support arms 2040 may be formed of the same material as the waveguides 2030 (e.g., injection molded plastic) and may fabricated as a single unit. Alternatively, the support arms 2040 may be connected by an adhesive or may have integrated installation elements, such as snaps (as shown in FIGS. 10A and 10B).

Figure 21A:
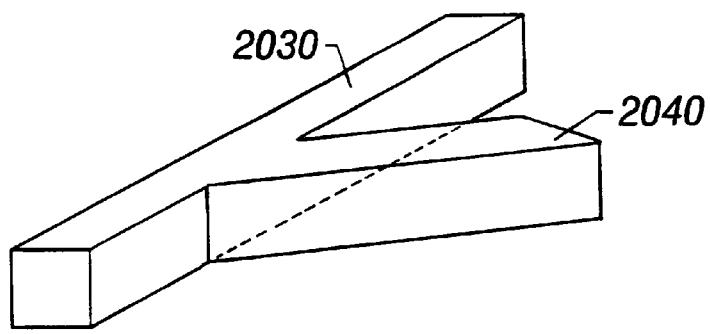
FIGS. 21A–21C are views of the junction between branch waveguides and support arms in a vehicle door panel waveguide assembly.
Figure 21B:
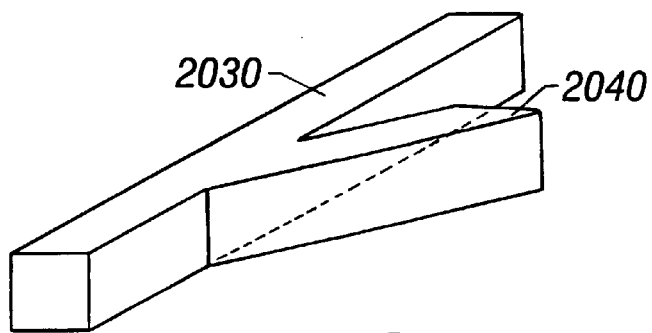
Figure 21C:
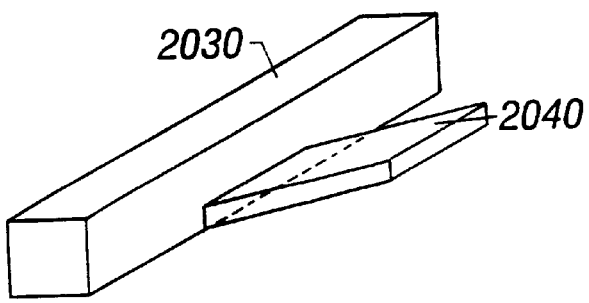

As shown in FIG. 21A, the support arms 2040 may be approximately the same thickness (in the direction perpendicular to the plane of the door panel) and width (in a direction parallel to the plane of the door panel) as the waveguides 2030. Alternatively, the support arms 2040 may be narrower in width (FIG. 21B) or thinner (FIG. 21C) than the waveguides 2030 to minimize the amount of light entering the support arms 2040.

Referring again to FIG. 20A, the support arms 2040 form an angle of about 67° with the branch waveguides 2030 (with respect to the direction the light is traveling) so that the amount of light entering the support arms 2040 is minimized. As discussed in "Analysis of Waveguide Geometries at Bends and Branches for the Directing of Light," which has been incorporated by reference, waveguides with branch angles greater than 45° transmit only a small percentage of the light in the main branch. For example, a waveguide with a branch angle of 67.5° transmits approximately 1.3% of the light in the main branch.

The branch waveguides 2030 may include bends 2045 near the lighting outputs 2010 or at other points along the waveguides (e.g., near the trunk waveguide 2020) so that the waveguide assembly 2000 can conform to the shape of the door panel 1900. The bends 2045 have bend ratios greater than 3:1 to minimize undesirable light leakage. Such a configuration prevents unaesthetic light emissions from cracks or gaps in the door panel 1900 structure.

Installation holes 2050 are positioned along the support arms 2040 so that the waveguide assembly 2000 can be installed in the door panel 1900. Screws or posts may be used to hold the waveguide assembly 2000 in position in the door panel 1900.

The door panel DLS provides several advantages. For example, it eliminates the need for electrical wiring and multiple light bulbs within the door panel. The single, high reliability light source in the DLS can meet all of the lighting requirements for the door. The source may be accessible through an access panel in the door, so that it can be easily replaced without removing the door panel. In addition, the light source may be located in another position within the vehicle, such as under the dashboard. Light may be carried from the light source to the door panel waveguide assembly through a waveguide or waveguide joint that passes from the vehicle body into the doors. Such a configuration reduces the electrical wiring required between the vehicle body and the doors, which reduces complexity and manufacturing costs.

Other embodiments are within the scope of the following claims.

What is claimed is:

1. An optical waveguide assembly for distributing light within a vehicle panel, comprising:

a light source;

a trunk waveguide configured to propagate light through internal reflection, the trunk waveguide having output branches and a trunk input portion optically coupled to the light source to receive light produced by the light source, wherein the trunk input portion and output branches comprise unitary portions of a one-piece molded waveguide that splits the received light via internal reflection as that light enters the output branches;

branch waveguides configured to propagate light through internal reflection, the branch waveguides extending from the output branches of the trunk waveguide to lighting outputs of the vehicle panel; and support arms extending between the branch waveguides and configured to support the branch waveguides within the vehicle panel.

2. The optical waveguide assembly of claim 1, further comprising a compact illuminator as the light source, the compact illuminator comprising:

a housing having reflective interior surfaces, a bulb positioned within the housing, and an optical waveguide output port configured to hold an optical waveguide in position to receive light from the bulb.

3. The optical waveguide assembly of claim 1, wherein the waveguides and support arms are formed from a single piece of solid material.

4. The optical waveguide assembly of claim 3, wherein the trunk waveguide is also formed from the single piece of solid material and wherein the solid material is injection molded plastic.

5. The optical waveguide assembly of claim 1, further comprising a compact illuminator as the light source, the compact illuminator comprising:

a housing having open ends configured to receive waveguides, and a reflector positioned within the housing.

6. The optical waveguide assembly of claim 5, wherein the reflector comprises:

open end portions, a central portion between the end portions, a light source positioned within the central portion, and side walls extending between the end portions and at least partially enclosing the central portion, the side walls protruding inward toward the light source.

7. The optical waveguide assembly of claim 1, further comprising lighting output elements positioned at the ends of the branch waveguides.

8. The optical waveguide assembly of claim 7, wherein at least one of the lighting output elements comprises:

an input face, a transmission portion extending from the input face, wherein the transmission portion widens at an end to form a conical end portion having a convex lens at an end of the conical end portion.

9. The optical waveguide assembly of claim 7, further comprising a waveguide bend as the lighting output element.

10. The optical waveguide assembly of claim 9, wherein the waveguide bend has a bend ratio that is less than 3:1.

11. The optical waveguide assembly of claim 9, wherein the waveguide bend has a bend ratio that is less than 1:1.

12. The optical waveguide assembly of claim 1, wherein the vehicle panel comprises a door panel.

13. An optical waveguide assembly for distributing light within a vehicle panel, comprising:

a light source;

a cylindrical sleeve configured to accommodate and receive light from the light source, the sleeve including a central axis;

a waveguide collar formed from a solid, planar block of material having:

a central portion configured to accommodate and surround the sleeve, and output branches extending in a plane away from the central portion, the plane being substantially perpendicular to the central axis;

branch waveguides configured to propagate light through internal reflection, the branch waveguides extending from the output branches of the waveguide collar to lighting outputs of the vehicle panel; and support arms extending between the branch waveguides and configured to support the branch waveguides within the vehicle panel.

14. The optical waveguide assembly of claim 13, wherein the vehicle panel comprises a door panel.

15. The optical waveguide assembly of claim 13, wherein the waveguides and support arms are formed from a single piece of solid material.

16. The optical waveguide assembly of claim 15, wherein the solid material is injection molded plastic.

17. The optical waveguide assembly of claim 13, further comprising lighting output elements positioned at the ends of the branch waveguides.

18. The optical waveguide assembly of claim 17, further comprising an optical waveguide output element as the lighting output element, the waveguide output element comprising:

an input face, a transmission portion extending from the input face, wherein the transmission portion widens at an end to form a conical end portion having a convex lens at an end of the conical end portion.

19. The optical waveguide assembly of claim 17, further comprising a waveguide bend as the lighting output element.

20. The optical waveguide assembly of claim 19, wherein the waveguide bend has a bend ratio that is less than 3:1.

21. The optical waveguide assembly of claim 19, wherein the waveguide bend has a bend ratio that is less than 1:1.

22. An optical waveguide assembly for distributing light within a vehicle panel, comprising:

a trunk waveguide configured to receive light from a light source, the trunk waveguide having outputs wherein the trunk waveguide splits the light from the light source via internal reflection and propagates the light to the outputs;

branch waveguides configured to propagate light through internal reflection, the branch waveguides extending from the outputs of the trunk waveguide to lighting outputs of the vehicle panel; and support arms extending between the branch waveguides and configured to support the branch waveguides within the vehicle panel, wherein the trunk waveguide, the branch waveguides, and the support arms are formed from a unitary piece of solid material.

23. The optical waveguide assembly of claim 20, wherein the solid material is injection molded plastic.

24. The optical waveguide assembly of claim 22, wherein the vehicle panel comprises a door panel.

25. The optical waveguide assembly of claim 20, further comprising lighting output elements positioned at the ends of the branch waveguides.

26. The optical waveguide assembly of claim 25, wherein at least one of the lighting output elements comprises:

an input face, a transmission portion extending from the input face, wherein the transmission portion widens at an end to form a conical end portion having a convex lens at an end of the conical end portion.

27. The optical waveguide assembly of claim 25, further comprising a waveguide bend as the lighting output element.

28. The optical waveguide assembly of claim 27, wherein the waveguide bend has a bend ratio that is less than 3:1.

29. The optical waveguide assembly of claim 27, wherein the waveguide bend has a bend ratio that is less than 1:1.

* * * * *

UNITED STATES PATENT AND TRADEMARK OFFICE
CERTIFICATE OF CORRECTION

PATENT NO. : 6,217,201 B1
DATED : April 17, 2001
INVENTOR(S) : George R. Hulse

It is certified that error appears in the above-identified patent and that said Letters Patent is hereby corrected as shown below:

Column 7,
Lines 15 and 18, delete "800'," and insert therefor -- 800, 800' --.
Line 21, delete "825'," and insert therefor -- 825, 825' --.
Line 23, delete "805'," and insert therefor -- 805, 805' --.
Line 24, delete "815'," and insert therefore -- 815, 815' --.
Line 24, delete "815'," and insert therein -- 815' --.
Line 26, delete "815'," and insert therefor -- 815, 815' --.
Line 29, after "815'," and insert therein -- , 815' --.
Line 30, delete "800'," and insert therefor -- 800, 800' --.
Line 30, delete "815'," and insert therefor -- 815, 815' --.
Lines 31 and 35, delete "805'," and insert therefor -- 805, 805' --.
Line 36, delete "815'," and insert therefor -- 815, 815' --.
Line 37, after "800" insert therein -- 800' --.
Lines 38 and 41, delete "900'," and insert therefor -- 900, 900' --.
Line 39, after "element" insert therein -- 905, --.
Lines 40 and 44, delete "905'," and insert therefor -- 905, 905' --.
Line 45, delete "900'," and insert therefor -- 900, 900' --.

Column 9,
Line 51, delete "1340" and insert therefor -- 1340' --.
Line 58, after "sleeve" insert therein -- 1340. --.
Line 60, delete "1300'," and insert therefor -- 1300, 1300' --.
Line 60, delete "1340'," and insert therefor -- 1340, 1340' --.
Line 61, delete "1300'," and insert therefor -- 1300, 1300' --.
Line 64, delete "1340'," and insert therefor -- 1340, 1340' --.

UNITED STATES PATENT AND TRADEMARK OFFICE
CERTIFICATE OF CORRECTION

PATENT NO. : 6,217,201 B1
DATED : April 17, 2001
INVENTOR(S) : George R. Hulse

It is certified that error appears in the above-identified patent and that said Letters Patent is hereby corrected as shown below:

<u>Column 10,</u>
Line 2, delete "1300'," and insert therefor -- 1300, 1300' --.
Line 27, after "collar" insert therein -- 1400, --.
Line 27, delete "1400'," and insert therefor -- 1400, 1400' --.
Line 30, after "collar" insert therein -- 1400, --.
Lines 31 and 35, delete "1400'," and insert therefor -- 1400, 1400' --.

Signed and Sealed this

First Day of July, 2003

JAMES E. ROGAN
*Director of the United States Patent and Trademark Office*